(12) United States Patent
Tanaka et al.

(10) Patent No.: US 10,444,479 B2
(45) Date of Patent: Oct. 15, 2019

(54) ZOOM LENS AND IMAGING APPARATUS

(71) Applicant: FUJIFILM Corporation, Tokyo (JP)

(72) Inventors: Takuya Tanaka, Saitama (JP); Masaru Yonezawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 30 days.

(21) Appl. No.: 15/854,280

(22) Filed: Dec. 26, 2017

(65) Prior Publication Data

US 2018/0188508 A1 Jul. 5, 2018

(30) Foreign Application Priority Data

Jan. 5, 2017 (JP) ................................. 2017-000496

(51) Int. Cl.
*G02B 13/02* (2006.01)
*G02B 15/14* (2006.01)
*G02B 13/06* (2006.01)
*G02B 15/163* (2006.01)
*G02B 15/24* (2006.01)

(52) U.S. Cl.
CPC ............. *G02B 15/14* (2013.01); *G02B 13/02* (2013.01); *G02B 13/06* (2013.01); *G02B 15/163* (2013.01); *G02B 15/24* (2013.01)

(58) Field of Classification Search
CPC ..... G02B 15/163; G02B 15/24; G02B 15/177
See application file for complete search history.

(56) References Cited

U.S. PATENT DOCUMENTS

2015/0241673 A1* 8/2015 Nagatoshi ............ G02B 15/167
359/683

FOREIGN PATENT DOCUMENTS

| JP | 2009-288619 A | 12/2009 |
| JP | 2015-161695 A | 9/2015 |
| JP | 2016-173481 A | 9/2016 |

* cited by examiner

*Primary Examiner* — Alicia M Harrington
(74) *Attorney, Agent, or Firm* — Studebaker & Brackett PC

(57) ABSTRACT

The zoom lens consists of, in order from an object side: a first lens group that has a positive refractive power; a second lens group that has a positive refractive power; a third lens group that has a negative refractive power; a fourth lens group; and a fifth lens group that has a positive refractive power. The first lens group and the fifth lens group remain stationary with respect to an image plane during zooming. The second lens group, the third lens group, and the fourth lens group are moved by changing distances between the lens groups and adjacent groups in a direction of an optical axis during zooming, and are positioned to be closer to the image side at a telephoto end than at a wide-angle end. Conditional Expression (1) is satisfied.

$$0.8 < pr1/f1 < 2.6 \qquad (1).$$

19 Claims, 25 Drawing Sheets

FIG. 1
EXAMPLE 1
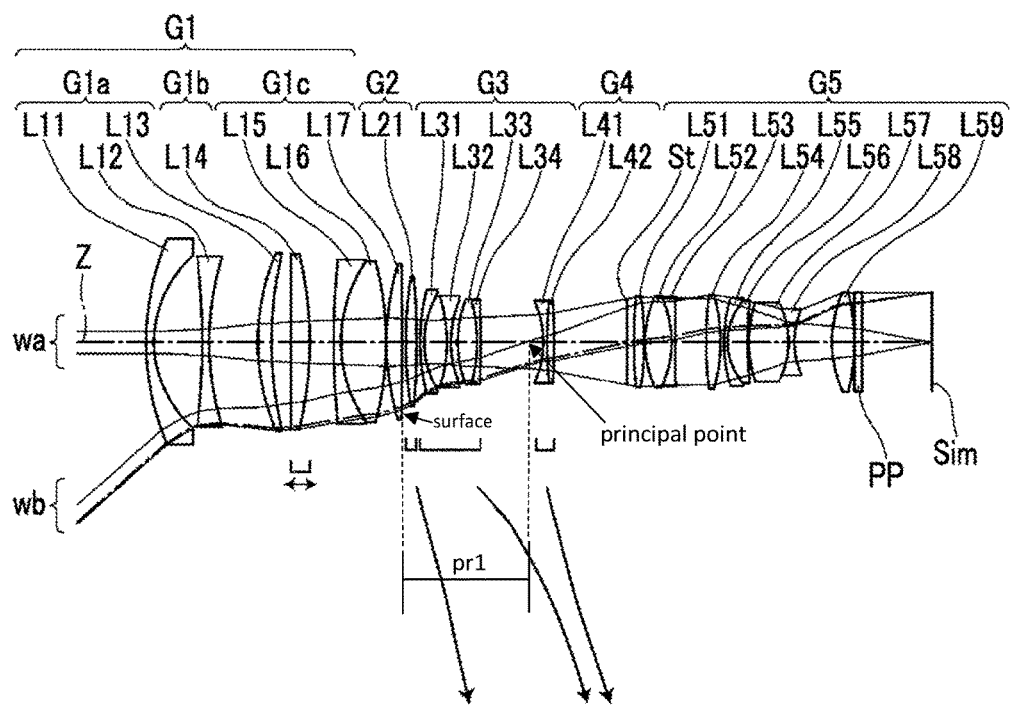
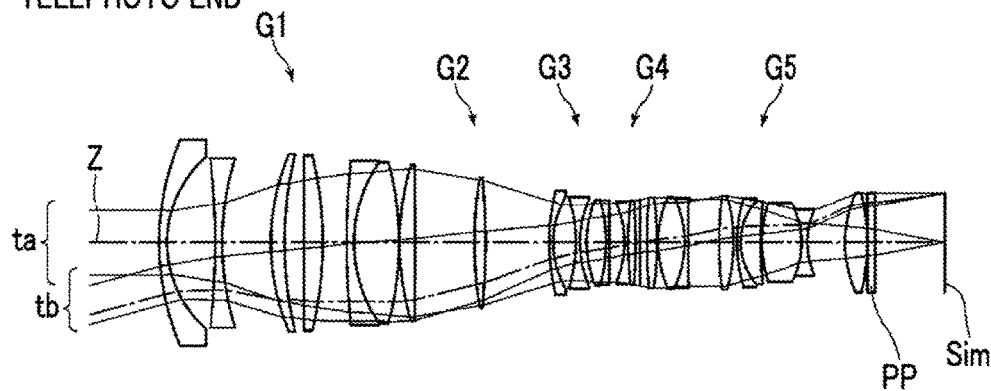

FIG. 2
EXAMPLE 2
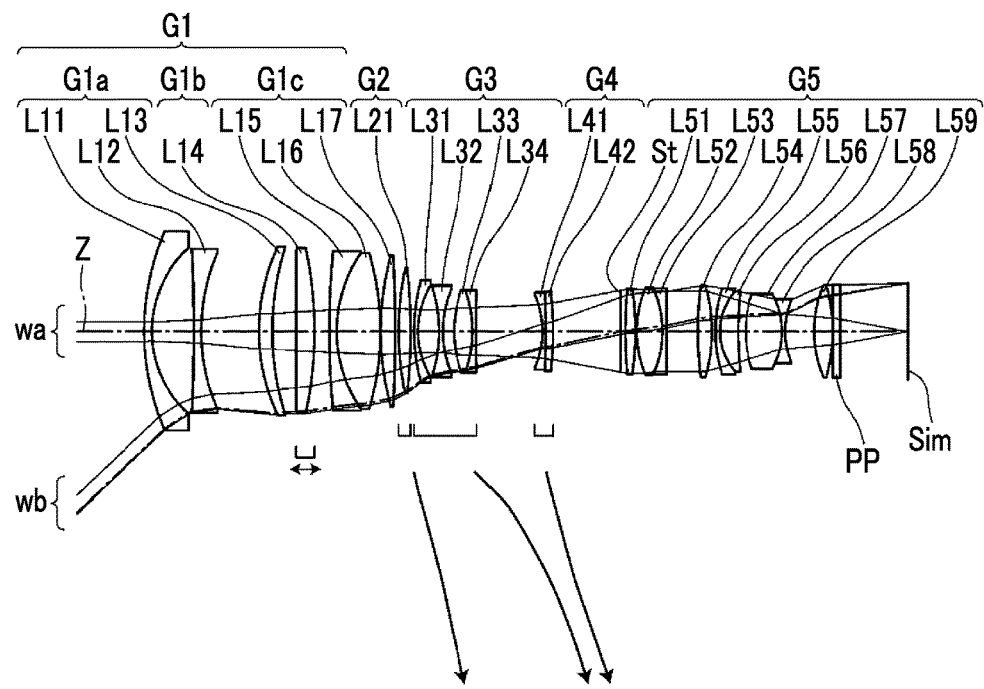
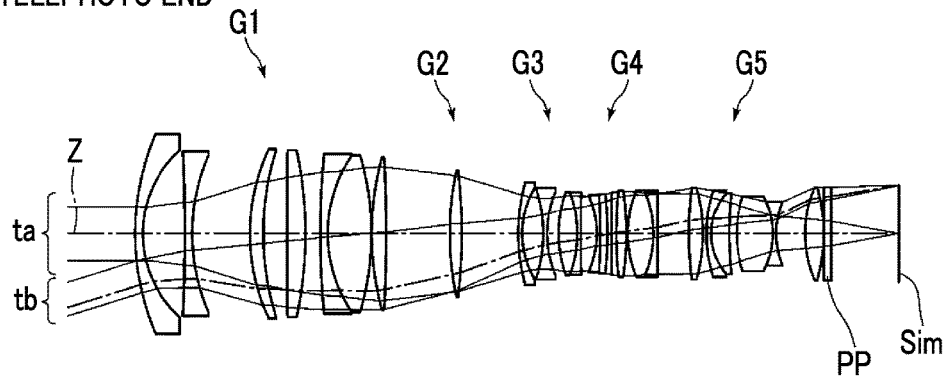

FIG. 3
EXAMPLE 3
WIDE-ANGLE END
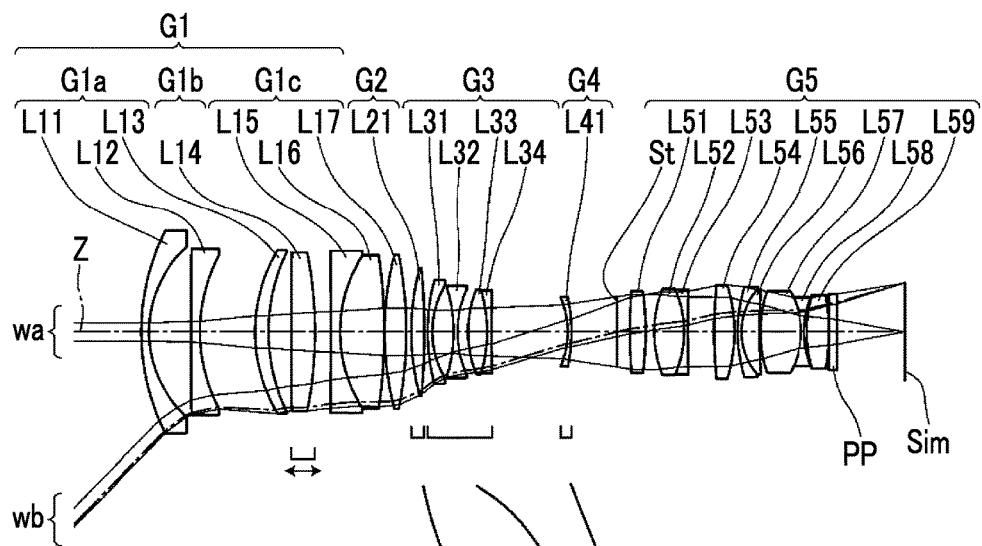
TELEPHOTO END
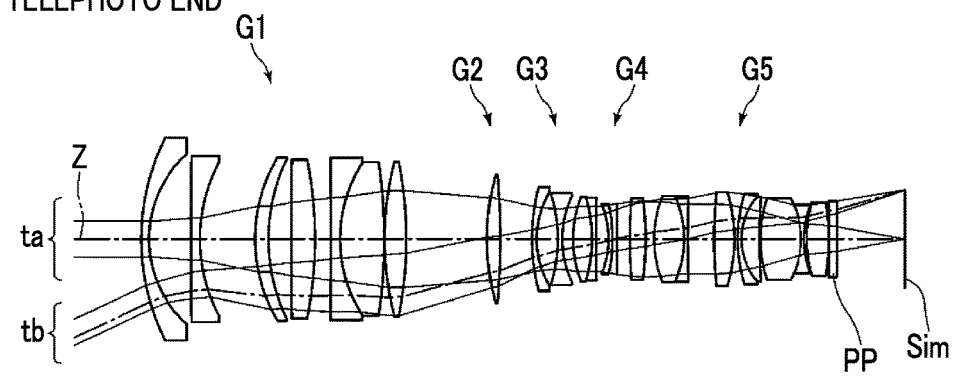

FIG. 4
EXAMPLE 4
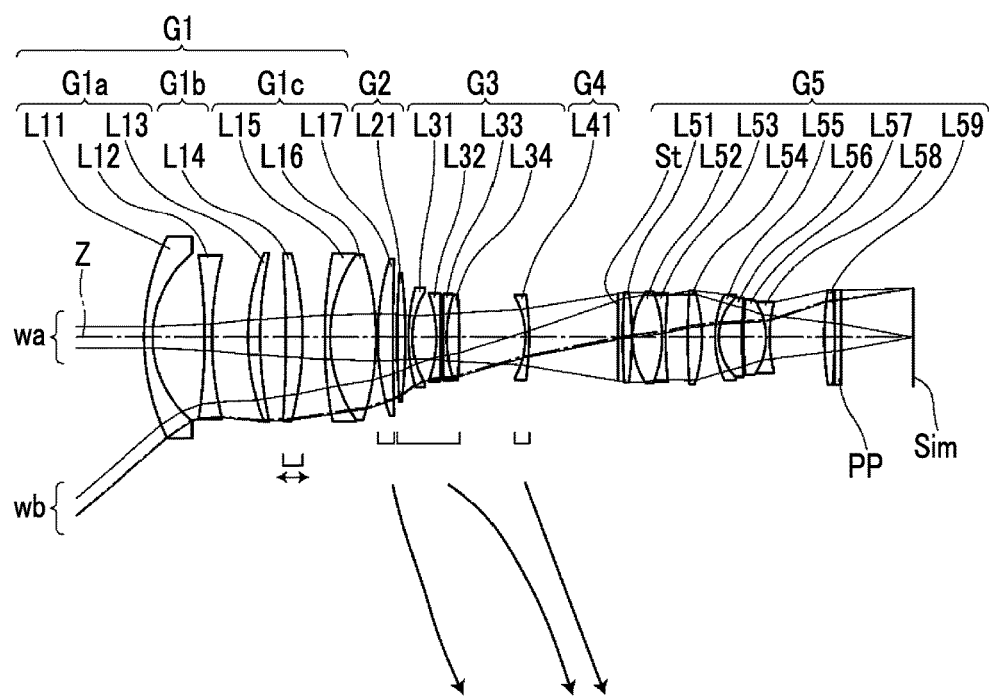
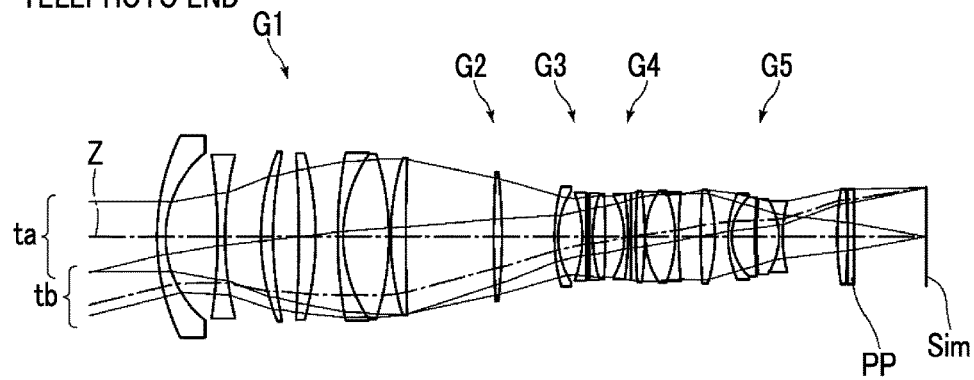

FIG. 5
EXAMPLE 5
WIDE-ANGLE END
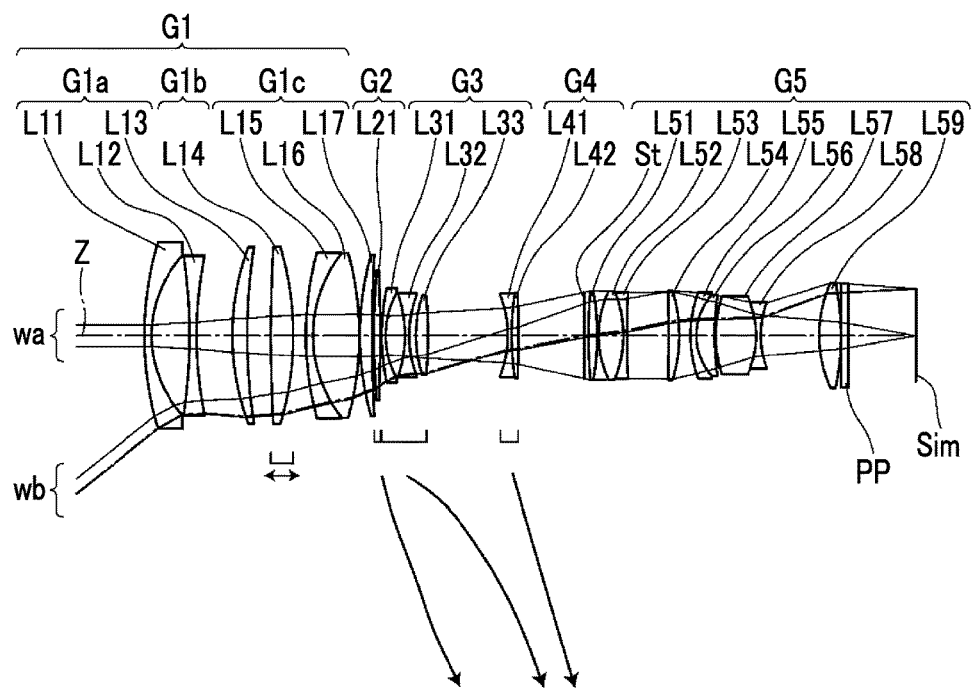
TELEPHOTO END
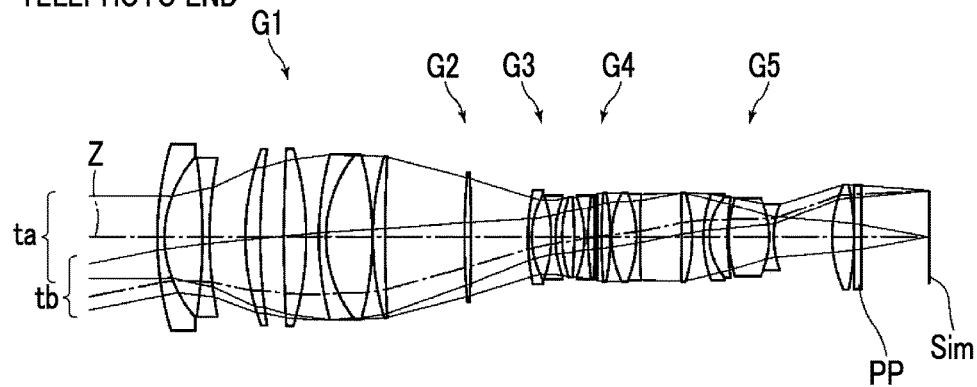

FIG. 6
EXAMPLE 6
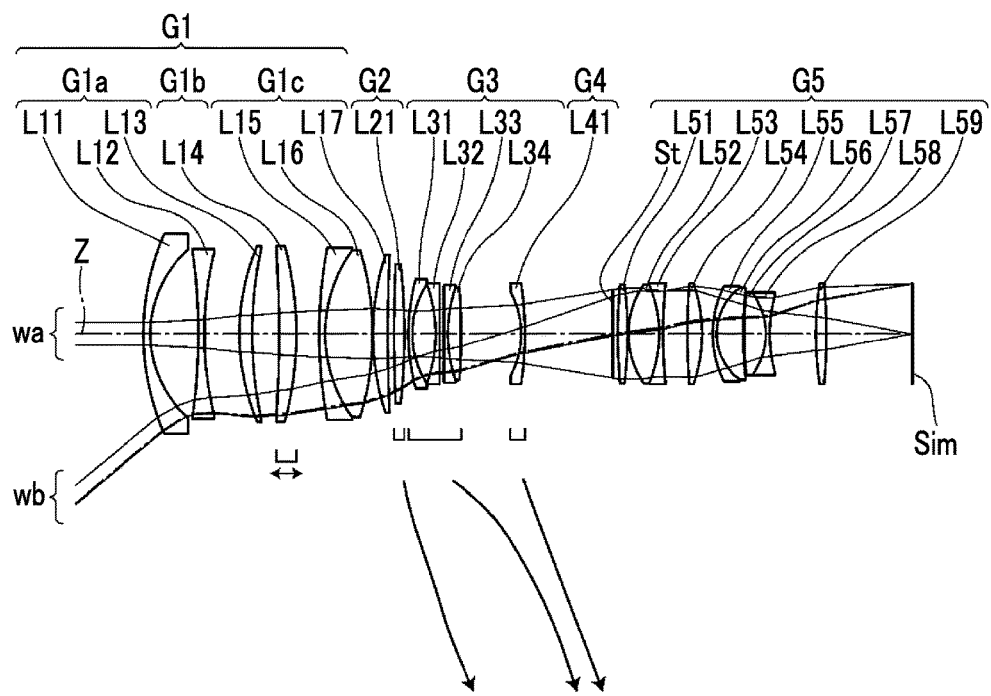
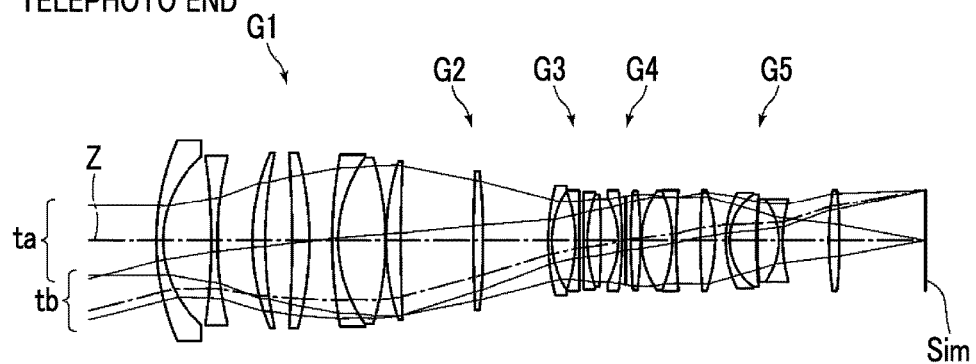

FIG. 7
EXAMPLE 7
WIDE-ANGLE END
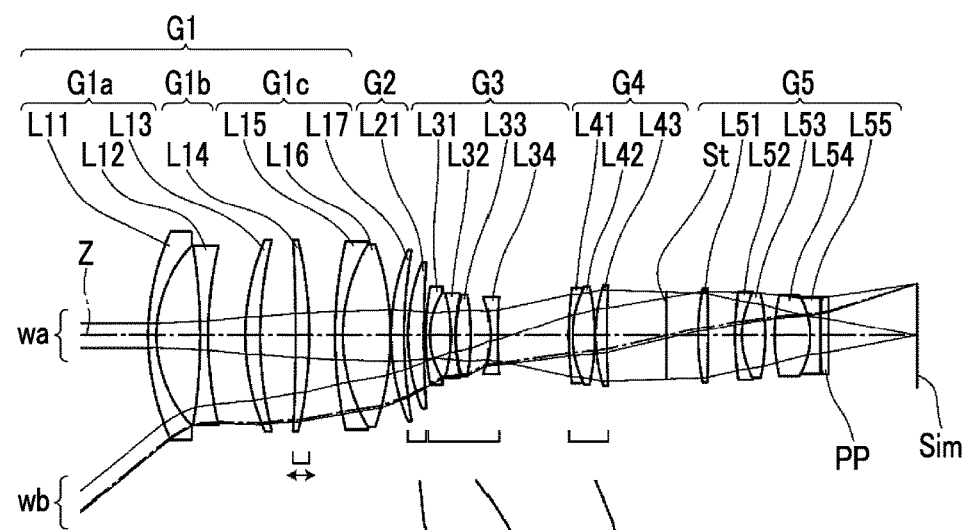
TELEPHOTO END
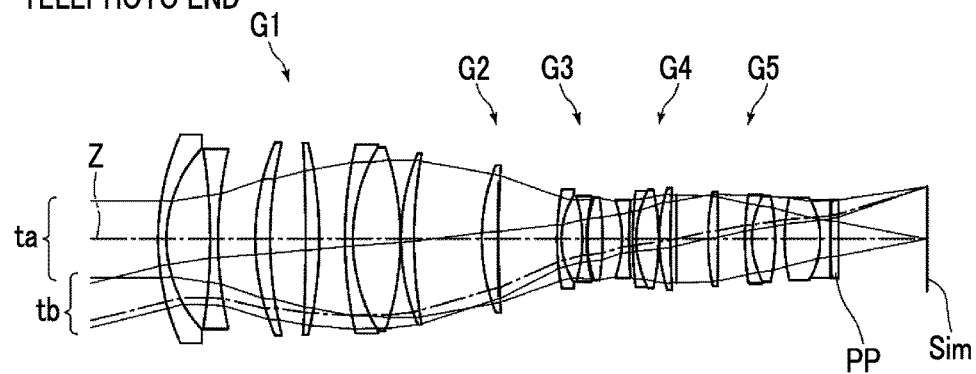

FIG. 8
EXAMPLE 8
WIDE-ANGLE END
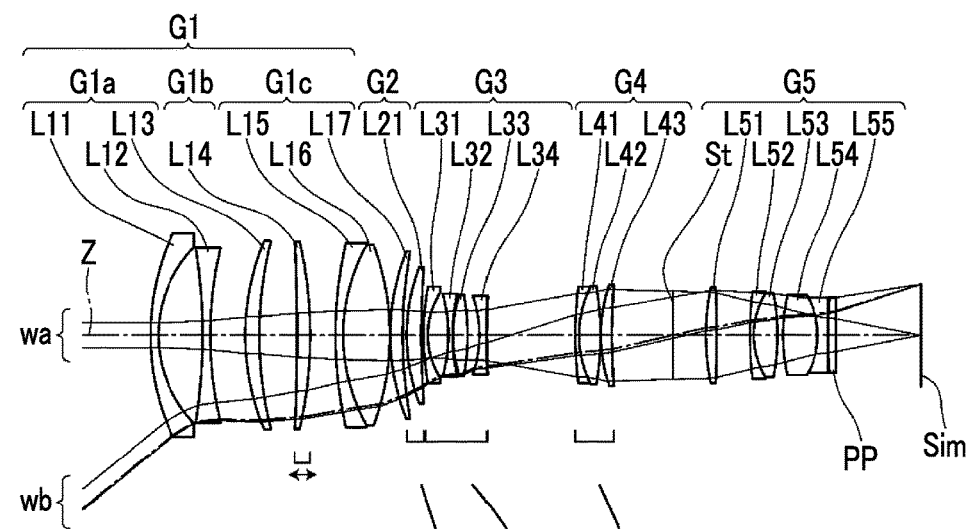
TELEPHOTO END
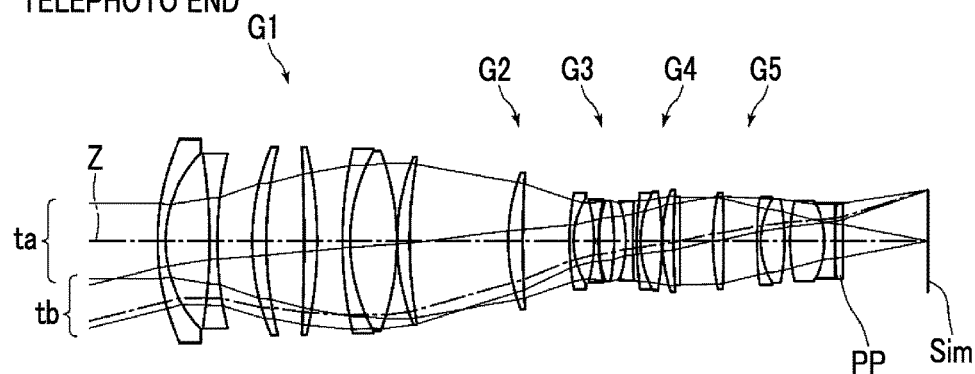

FIG. 9
EXAMPLE 9
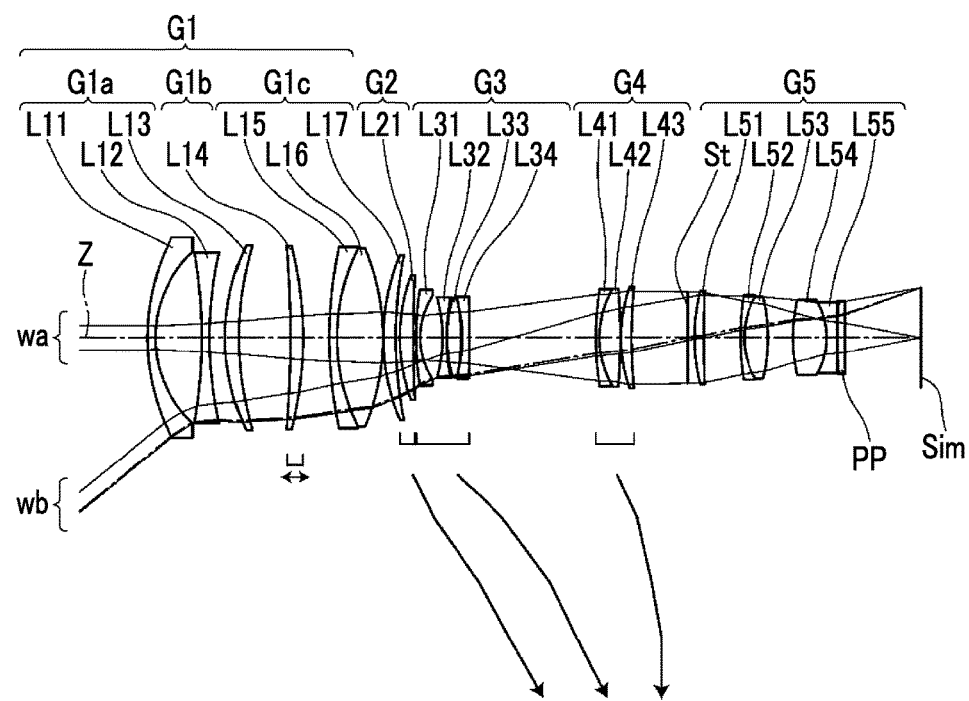
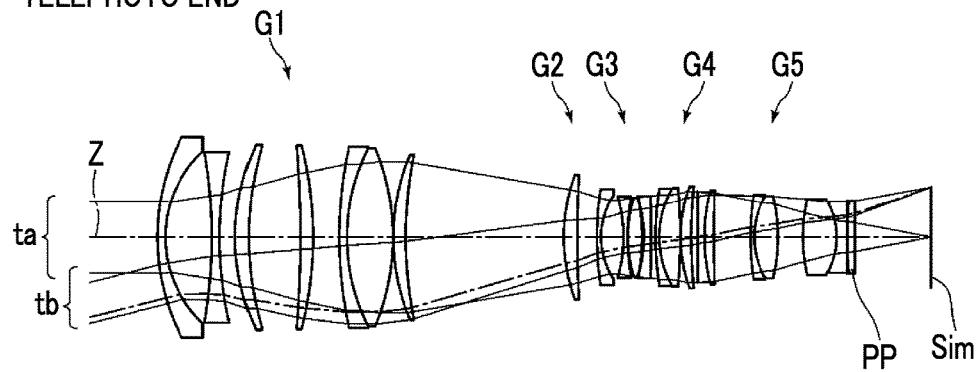

FIG. 10
EXAMPLE 10
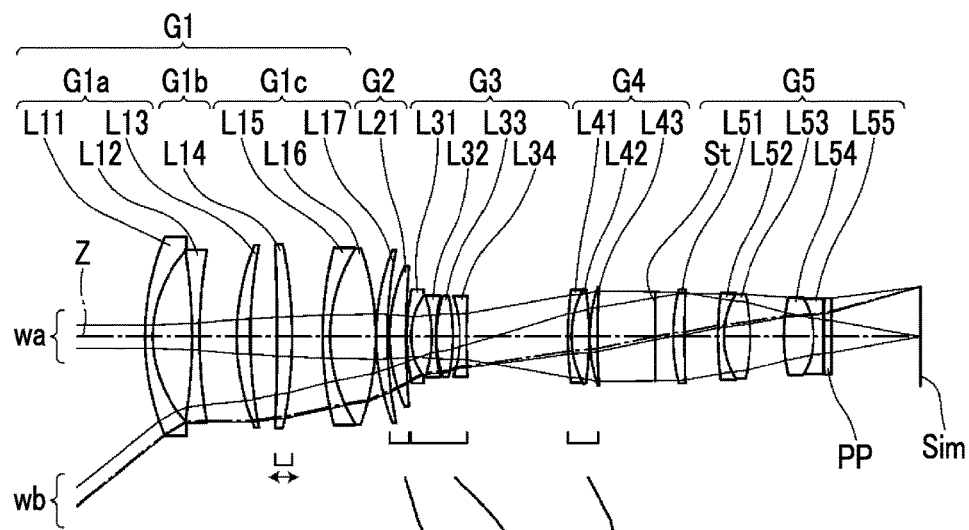
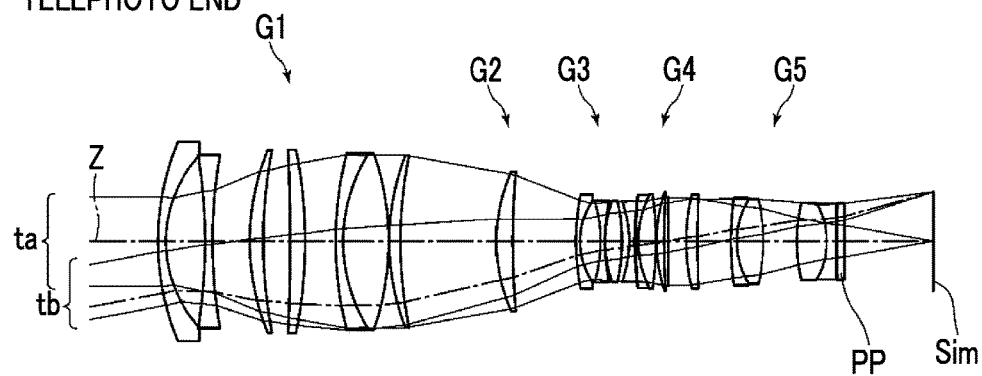

FIG. 11
EXAMPLE 11
WIDE-ANGLE END
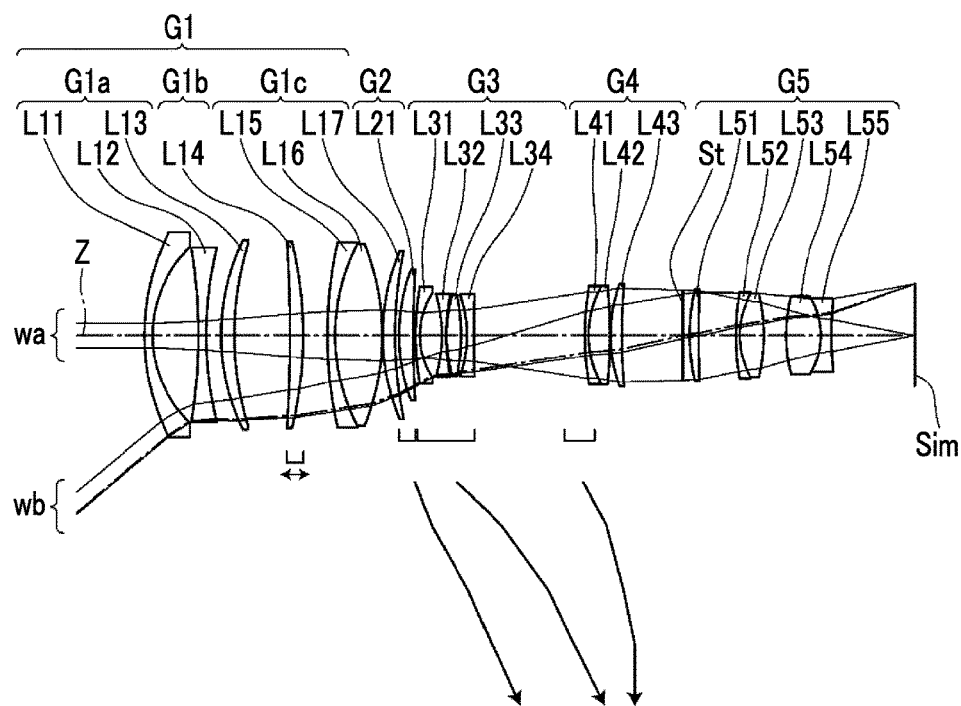
TELEPHOTO END
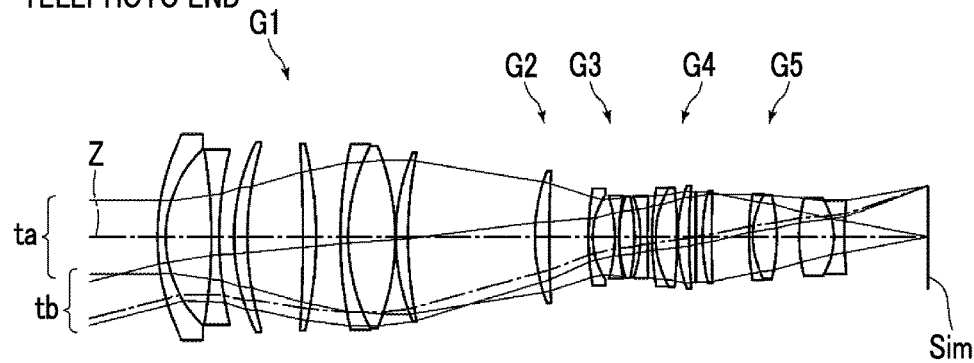

FIG. 12
EXAMPLE 12
WIDE-ANGLE END
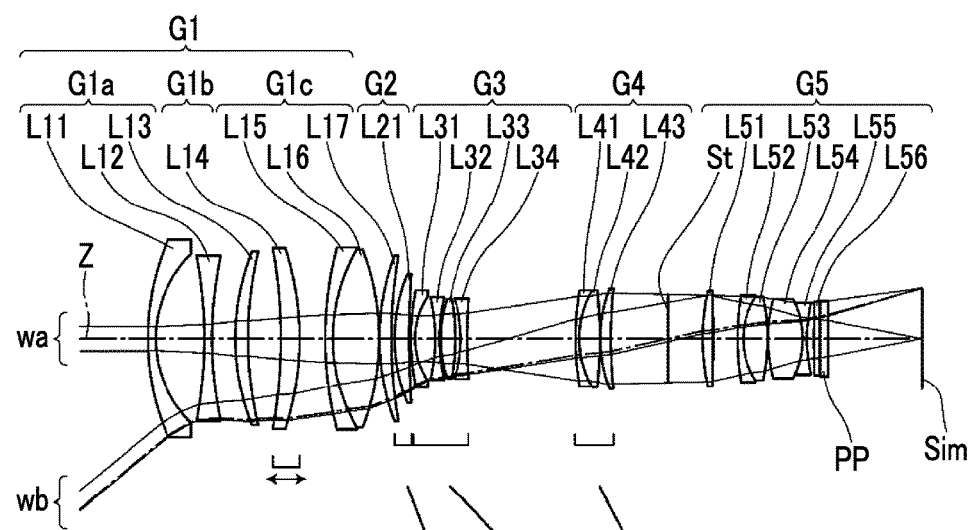
TELEPHOTO END
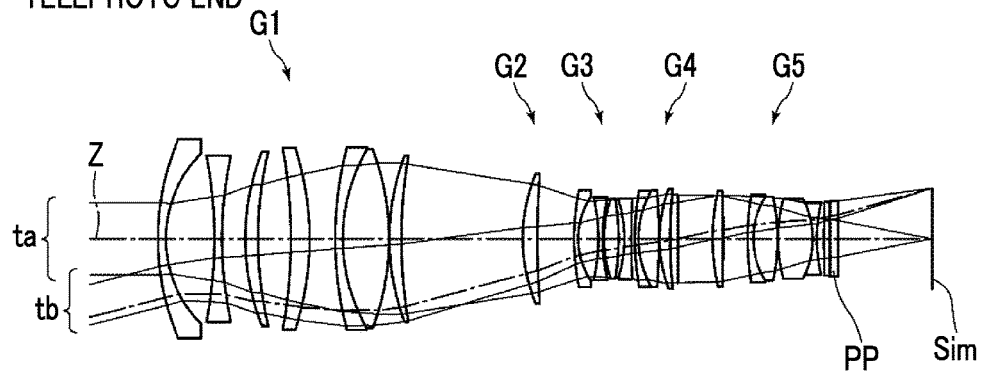

EXAMPLE 12

ZOOM LENS AND IMAGING APPARATUS

CROSS REFERENCE TO RELATED APPLICATIONS

The present application claims priority under 35 U.S.C. § 119 to Japanese Patent Application No. 2017-000496 filed on Jan. 5, 2017. The above application is hereby expressly incorporated by reference, in its entirety, into the present application.

BACKGROUND OF THE INVENTION

1. Field of the Invention

The present invention relates to a zoom lens suitable for electronic cameras such as movie imaging cameras, broadcast cameras, digital cameras, video cameras, and surveillance cameras, and to an imaging apparatus comprising the zoom lens.

2. Description of the Related Art

As zoom lenses used in electronic cameras such as movie imaging cameras, broadcast cameras, digital cameras, video cameras, and surveillance cameras, zoom lenses disclosed in JP2015-161695A, JP2009-288619A, and JP2016-173481A have been proposed.

SUMMARY OF THE INVENTION

In imaging apparatuses such as movie imaging cameras and broadcast cameras, there is a demand for a zoom lens that is compact and lightweight but has favorable optical performance. In particular, reduction in size and reduction in weight are strongly demanded for imaging modes focusing on maneuverability and operability. Meanwhile, there is also a demand for cameras in the above-mentioned field to be capable of performing imaging with a wide angle of view. However, it is not easy to achieve both wide angle and reduction in size.

It can not be said that All the lens systems described in JP2015-161695A, JP2009-288619A, and JP2016-173481A satisfy both wide angle and miniaturization sufficiently with respect to the level that has been demanded in recent years.

The present invention has been made in consideration of the above-mentioned situations, it is an object of the present invention to provide a zoom lens for which reduction in size and weight is achieved and high optical performance is achieved with wide angle, and an imaging apparatus comprising the zoom lens.

A zoom lens of the present invention consists of, in order from an object side: a first lens group that has a positive refractive power; a second lens group that has a positive refractive power; a third lens group that has a negative refractive power; a fourth lens group; and a fifth lens group that has a positive refractive power. The first lens group and the fifth lens group remain stationary with respect to an image plane during zooming. The second lens group, the third lens group, and the fourth lens group are moved by changing distances between the lens groups and adjacent groups in a direction of an optical axis during zooming, and are positioned to be closer to the image side at a telephoto end than at a wide-angle end. In addition, it is preferable that Conditional Expression (1) is satisfied.

$$0.8 < pr1/f1 < 2.6 \tag{1}$$

Here, $pr1$ is a distance on the optical axis from a surface, which is closest to the image side in the first lens group, to a position of an image side principal point of the first lens group, and $f1$ is a focal length of the first lens group.

Here, the sign of $pr1$ is positive in a case where the position of the image side principal point of the first lens group is closer to the image side than the surface closest to the image side in the first lens group, and is negative in a case where the position is on the object side. Further, in a case where the zoom lens of the present invention has a focusing function, all the signs of the focal lengths in the conditional expressions are signs in a case where the object at infinity in focus.

It is more preferable that Conditional Expression (1-1) is satisfied.

$$0.8 < pr1/f1 < 1.9 \tag{1-1}$$

It is preferable that the zoom lens of the present invention satisfies Conditional Expression (2). In addition, it is more preferable that Conditional Expression (2-1) is satisfied.

$$2 < f1/(fw \cdot \tan \theta w) < 5.8 \tag{2}$$

$$2.5 < f1/(fw \cdot \tan \theta w) < 4.6 \tag{2-1}$$

Here, $f1$ is a focal length of the first lens group, $fw$ is a focal length of the whole system at the wide-angle end, and $\theta w$ is a half angle of view at the wide-angle end.

It is preferable that Conditional Expression (3) is satisfied.

$$0 < f1/f2 < 0.8 \tag{3}$$

Here, $f1$ is a focal length of the first lens group, and $f2$ is a focal length of the second lens group.

It is preferable that the first lens group consists of, in order from the object side, a first-a lens group that has a negative refractive power and remains stationary with respect to the image plane during focusing, a first-b lens group that has a positive refractive power and is moved by changing a distance in the direction of the optical axis between the first-b lens group and an adjacent lens group during focusing, and a first-c lens group that has a positive refractive power.

In this case, it is preferable that Conditional Expression (4) is satisfied. It is more preferable that Conditional Expression (4-1) is satisfied.

$$-3.4 < f1c/f1a < -0.5 \tag{4}$$

$$-2.9 < f1c/f1a < -1.3 \tag{4-1}$$

Here, $f1c$ is a focal length of the first-c lens group, and $f1a$ is a focal length of the first-a lens group.

It is preferable that Conditional Expression (5) is satisfied. In addition, it is more preferable that Conditional Expression (5-1) is satisfied.

$$3.1 < f1b/f1 < 8 \tag{5}$$

$$3.7 < f1b/f1 < 6 \tag{5-1}$$

Here, $f1b$ is a focal length of the first-b lens group, and $f1$ is a focal length of the first lens group.

It is preferable that Conditional Expression (6) is satisfied. In addition, it is more preferable that Conditional Expression (6-1) is satisfied.

$$2.4 < f1b/f1c < 8 \tag{6}$$

$$3 < f1b/f1c < 6 \tag{6-1}$$

Here, $f1b$ is a focal length of the first-b lens group, and $f1c$ is a focal length of the first-c lens group.

It is preferable that Conditional Expression (7) is satisfied. In addition, it is more preferable that Conditional Expression (7-1) is satisfied.

$$0.5 < f1c/f1 < 1.4 \quad (7)$$

$$0.8 < f1c/f1 < 1.3 \quad (7\text{-}1)$$

Here, f1c is a focal length of the first-c lens group, and f1 is a focal length of the first lens group.

In the zoom lens of the present invention, it is preferable that the first-a lens group consists of, in order from the object side, a negative meniscus lens that is convex toward the object side, a negative lens that is concave toward the image side, and a positive meniscus lens that is convex toward the object side.

It is preferable that the first-b lens group consists of a positive lens that is convex toward the image side, and the first-c lens group consists of, in order from the object side, a cemented lens that is formed by cementing a negative lens concave toward the image side and a biconvex lens in order from the object side, and a positive lens that is convex toward the object side.

The fourth lens group may have a negative refractive power, and may have a positive refractive power.

An imaging apparatus of the present invention comprises the above-mentioned zoom lens of the present invention.

It should be noted that the term "consists of ~" means that the zoom lens may include not only the above-mentioned elements but also lenses substantially having no powers, optical elements, which are not lenses, such as a stop, a mask, a cover glass, and a filter, and mechanism parts such as a lens flange, a lens barrel, an imaging element, and a hand shaking correction mechanism.

Further, reference signs of surface shapes and refractive powers of the lenses are assumed as those in paraxial regions in a case where some lenses have aspheric surfaces.

The zoom lens of the present invention is configured to consist of, in order from an object side: a first lens group that has a positive refractive power; a second lens group that has a positive refractive power; a third lens group that has a negative refractive power; a fourth lens group; and a fifth lens group that has a positive refractive power. The first lens group and the fifth lens group remain stationary with respect to an image plane during zooming. The second lens group, the third lens group, and the fourth lens group are moved by changing distances between the lens groups and adjacent groups in a direction of an optical axis during zooming, and are positioned to be closer to the image side at a telephoto end than at a wide-angle end. In addition, it is preferable that Conditional Expression (1) is satisfied. With such a configuration, it is possible to provide a zoom lens for which reduction in size and weight is achieved and high optical performance is achieved with wide angle, and an imaging apparatus comprising the zoom lens.

$$0.8 < pr1/f1 < 2.6 \quad (1)$$

BRIEF DESCRIPTION OF THE DRAWINGS

FIG. 1 is a cross-sectional view illustrating a lens configuration of a zoom lens (common to Example 1) according to an embodiment of the present invention.

FIG. 2 is a cross-sectional view illustrating a lens configuration of a zoom lens of Example 2 of the present invention.

FIG. 3 is a cross-sectional view illustrating a lens configuration of a zoom lens of Example 3 of the present invention.

FIG. 4 is a cross-sectional view illustrating a lens configuration of a zoom lens of Example 4 of the present invention.

FIG. 5 is a cross-sectional view illustrating a lens configuration of a zoom lens of Example 5 of the present invention.

FIG. 6 is a cross-sectional view illustrating a lens configuration of a zoom lens of Example 6 of the present invention.

FIG. 7 is a cross-sectional view illustrating a lens configuration of a zoom lens of Example 7 of the present invention.

FIG. 8 is a cross-sectional view illustrating a lens configuration of a zoom lens of Example 8 of the present invention.

FIG. 9 is a cross-sectional view illustrating a lens configuration of a zoom lens of Example 9 of the present invention.

FIG. 10 is a cross-sectional view illustrating a lens configuration of a zoom lens of Example 10 of the present invention.

FIG. 11 is a cross-sectional view illustrating a lens configuration of a zoom lens of Example 11 of the present invention.

FIG. 12 is a cross-sectional view illustrating a lens configuration of a zoom lens of Example 12 of the present invention.

DESCRIPTION OF THE PREFERRED EMBODIMENTS

Figure 13:
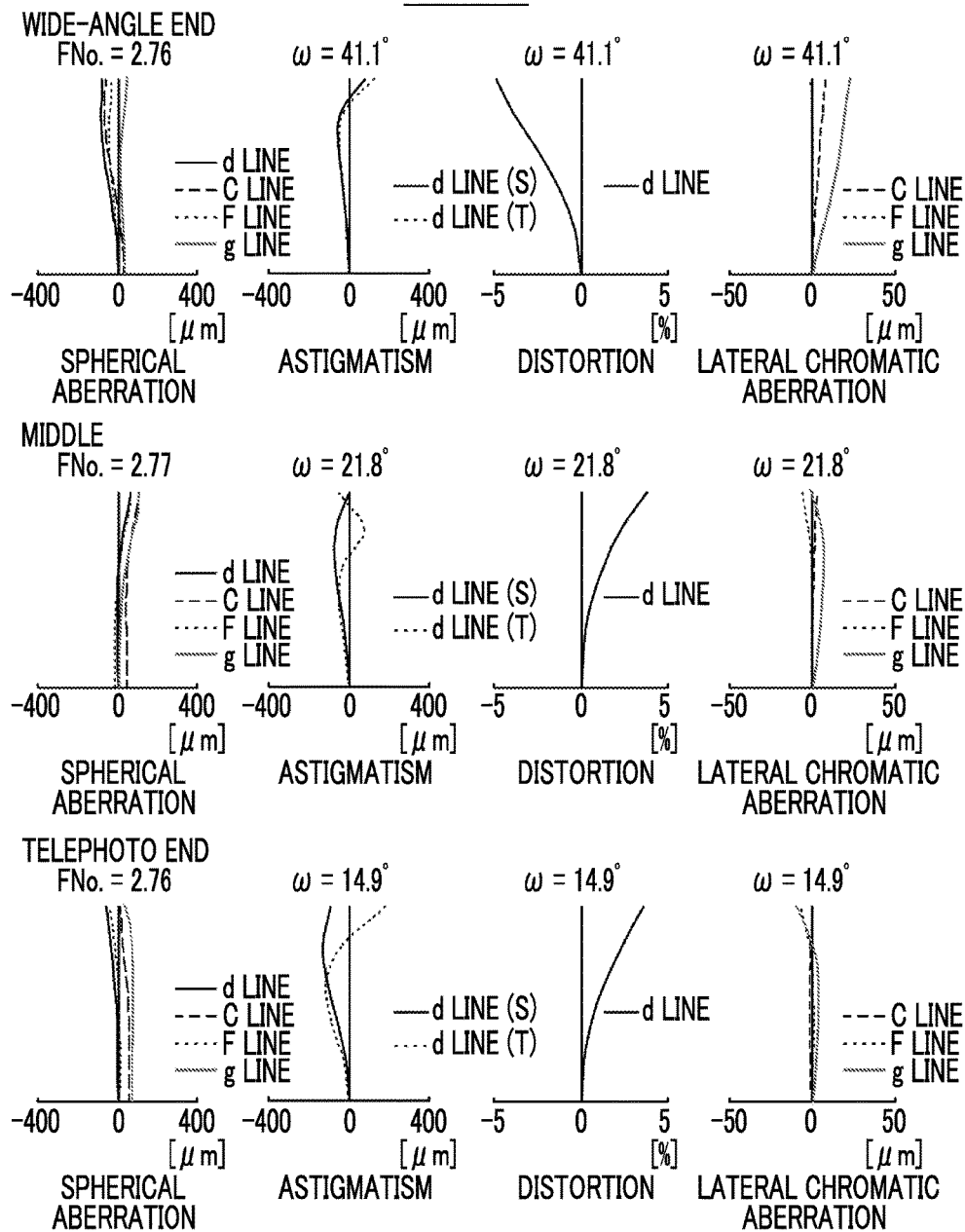
FIG. 13 is a diagram of aberrations of the zoom lens of Example 1 of the present invention.

Hereinafter, embodiments of the present invention will be described with reference to drawings. FIG. 1 is a cross-sectional view illustrating a lens configuration and an optical path of a zoom lens according to an embodiment of the present invention. In FIG. 1, aberrations in the wide-angle end state are shown in the upper part, on-axis rays wa and rays with the maximum angle of view wb are shown as rays. In addition, aberrations in the telephoto end state are shown in the lower part, and on-axis rays ta and rays with the maximum angle of view tb are shown as rays. It should be noted that the example shown in FIG. 1 corresponds to the zoom lens of Example 1 to be described later. FIG. 1 shows a state where the object at infinity is in focus, where the left side of the drawing is the object side and the right side of the drawing is the image side. It should be noted that the aperture stop St shown in the drawing does not necessarily indicate its size and shape, and indicates a position of the stop on the optical axis Z.

In order to mount the zoom lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

A zoom lens of the present embodiment is configured to consist of, in order from an object side: a first lens group G1 that has a positive refractive power; a second lens group G2 that has a positive refractive power; a third lens group G3 that has a negative refractive power; a fourth lens group G4; and a fifth lens group G5 that has a positive refractive power. The first lens group G1 and the fifth lens group G5 remain stationary with respect to an image plane Sim during zooming. The second lens group G2, the third lens group G3, and the fourth lens group G4 are moved by changing distances between the lens groups and adjacent groups in a direction of an optical axis during zooming, and are positioned to be closer to the image side at a telephoto end than at a wide-angle end.

By forming the first lens group G1 closest to the object side as a group having a positive refractive power, it is possible to shorten the total length of the lens system. As a result, there is an advantage in reduction in size. Further, the second lens group G2 has a positive refractive power, and is formed as a movable group that moves from the object side to the image side during zooming from the wide-angle end to the telephoto end. Thereby, it is possible to suppress the effective diameter of the second lens group G2 on the telephoto side, and it is possible to suppress the outer diameter of the second lens group G2. As a result, it is possible to achieve reduction in size and weight. Furthermore, the third lens group G3 has a main zooming function, but the second lens group G2 having a positive refractive power is disposed between the third lens group G3 and the first lens group G1 which remains stationary during zooming, and the second lens group G2 is moved during zooming. Thereby, it is possible to suppress change in spherical aberration during zooming. In addition, by forming the fourth lens group G4 as a movable group, it is possible to correct defocusing during zooming. Further, by forming the fifth lens group G5 closest to the image side as a group having a positive refractive power, it is possible to suppress an increase in incident angle of the principal ray of the off-axis rays incident onto the image plane Sim. Thus, it is possible to suppress shading.

The zoom lens is configured to satisfy Conditional Expression (1). By not allowing the result of Conditional Expression (1) to be equal to or less than the lower limit, widening in distance between the principal points of the first lens group G1 and the third lens group G3 at the wide-angle end can be suppressed. Thereby, the third lens group G3 can be brought to be close to a position, at which the absolute value of the lateral magnification is small, without making the refractive power of the first lens group G1 excessively strong. Thus, it is possible to suppress various aberrations at the wide-angle end. As a result, there is an advantage in achieving wide angle. By not allowing the result of Conditional Expression (1) to be equal to or greater than the upper limit, it is possible to prevent the position of the principal point of the first lens group G1 from being close to the image side, and to prevent the position of the third lens group G3 at the wide-angle end from being close to the image side. Therefore, it is possible to minimize the total length of the lens system. It should be noted that Conditional Expression (1-1), more preferably, Conditional Expression (1-2) is satisfied. Then, it is possible to obtain more favorable characteristics.

$$0.8 < pr1/f1 < 2.6 \tag{1}$$

$$0.8 < pr1/f1 < 1.9 \tag{1-1}$$

$$0.9 < pr1/f1 < 1.7 \tag{1-2}$$

Here, pr1 is a distance on the optical axis from a surface, which is closest to the image side in the first lens group G1, to a position of an image side principal point of the first lens group G1, and f1 is a focal length of the first lens group G1.

It is preferable that the zoom lens of the present embodiment satisfies Conditional Expression (2). By not allowing the result of Conditional Expression (2) to be equal to or less than the lower limit, there is an advantage in suppressing occurrence of spherical aberration at the telephoto end. By not allowing the result of Conditional Expression (2) to be equal to or greater than the upper limit, there is an advantage in reduction in size. It should be noted that Conditional Expression (2-1) is satisfied. Then, it is possible to obtain more favorable characteristics.

$$2 < f1/(fw \cdot \tan \theta w) < 5.8 \tag{2}$$

$$2.5 < f1/(fw \cdot \tan \theta w) < 4.6 \tag{2-1}$$

Here, f1 is a focal length of the first lens group G1, fw is a focal length of the whole system at the wide-angle end, and θw is a half angle of view at the wide-angle end.

It is preferable that Conditional Expression (3) is satisfied. By not allowing the result of Conditional Expression (3) to be equal to or less than the lower limit, it is possible to minimize the effective diameter of the second lens group G2 on the telephoto side, and it is possible to suppress the outer diameter of the second lens group G2. Thus, it is possible to achieve reduction in size and weight. By not allowing the result of Conditional Expression (3) to be equal to or greater than the upper limit, the refractive power of the second lens group G2 can be prevented from becoming excessively strong, and the principal points of the first lens group G1 and the second lens group G2 at the wide-angle end can be prevented from excessively shifting to the image side. Thus, it is possible to minimize the total length.

$$0 < f1/f2 < 0.8 \tag{3}$$

Here, f1 is a focal length of the first lens group G1, and f2 is a focal length of the second lens group G2.

It is preferable that the first lens group G1 consists of, in order from the object side, a first-a lens group G1a that has a negative refractive power and remains stationary with respect to the image plane during focusing, a first-b lens group G1b that has a positive refractive power and is moved by changing a distance in the direction of the optical axis between the first-b lens group G1b and an adjacent lens group during focusing, and a first-c lens group G1c that has a positive refractive power. With such a configuration, it is possible to reduce fluctuation in spherical aberration, longitudinal chromatic aberration, and an angle of view during focusing.

In this case, it is preferable that Conditional Expression (4) is satisfied. By not allowing the result of Conditional Expression (4) to be equal to or less than the lower limit, there is an advantage in correcting off-axis aberrations such as field curvature and distortion at the wide-angle end. Further, it becomes easy to make the position of the image side principal point of the first lens group G1 close to the image side, and thus the lower limit of Conditional Expression (1) is easily satisfied. By not allowing the result of Conditional Expression (4) to be equal to or greater than the upper limit, there is an advantage in correcting spherical aberration and field curvature at the telephoto end. It should be noted that Conditional Expression (4-1), more preferably, Conditional Expression (4-2) is satisfied. Then, it is possible to obtain more favorable characteristics.

$$-3.4 < f1c/f1a < -0.5 \qquad (4)$$

$$-2.9 < f1c/f1a < -1.3 \qquad (4\text{-}1)$$

$$-2.4 < f1c/f1a < -1.3 \qquad (4\text{-}2)$$

Here, f1c is a focal length of the first-c lens group G1c, and
f1a is a focal length of the first-a lens group G1a.

It is preferable that Conditional Expression (5) is satisfied. By not allowing the result of Conditional Expression (5) to be equal to or less than the lower limit, there is an advantage in correcting fluctuation in aberration during focusing. By not allowing the result of Conditional Expression (5) to be equal to or greater than the upper limit, the amount of movement of the first-b lens group G1b during focusing is suppressed. As a result, there is an advantage in reducing the total length of the first lens group G1 as a focusing group. It should be noted that Conditional Expression (5-1) is satisfied. Then, it is possible to obtain more favorable characteristics.

$$3.1 < f1b/f1 < 8 \qquad (5)$$

$$3.7 < f1b/f1 < 6 \qquad (5\text{-}1)$$

Here, f1b is a focal length of the first-b lens group G1b, and
f1 is a focal length of the first lens group G1.

It is preferable that Conditional Expression (6) is satisfied. By not allowing the result of Conditional Expression (6) to be equal to or less than the lower limit, there is an advantage in correcting fluctuation in aberration during focusing. By not allowing the result of Conditional Expression (6) to be equal to or greater than the upper limit, the amount of movement of the first-b lens group G1b during focusing is suppressed. As a result, there is an advantage in reducing the total length of the first lens group G1 as a focusing group. It should be noted that Conditional Expression (6-1) is satisfied. Then, it is possible to obtain more favorable characteristics.

$$2.4 < f1b/f1c < 8 \qquad (6)$$

$$3 < f1b/f1c < 6 \qquad (6\text{-}1)$$

Here, f1b is a focal length of the first-b lens group G1b, and
f1c is a focal length of the first-c lens group G1c.

It is preferable that Conditional Expression (7) is satisfied. By not allowing the result of Conditional Expression (7) to be equal to or less than the lower limit, the amount of movement of the first-b lens group G1b during focusing is suppressed. As a result, there is an advantage in reducing the total length of the first lens group G1 as a focusing group. By not allowing the result of Conditional Expression (7) to be equal to or greater than the upper limit, there is an advantage in correcting spherical aberration and field curvature. In addition, there is an advantage in correcting spherical aberration and field curvature during focusing. It should be noted that Conditional Expression (7-1) is satisfied. Then, it is possible to obtain more favorable characteristics.

$$0.5 < f1c/f1 < 1.4 \qquad (7)$$

$$0.8 < f1c/f1 < 1.3 \qquad (7\text{-}1)$$

Here, f1c is a focal length of the first-c lens group G1c, and
f1 is a focal length of the first lens group G1.

In the zoom lens of the present embodiment, it is preferable that the first-a lens group G1a consists of, in order from the object side, a negative meniscus lens that is convex toward the object side, a negative lens that is concave toward the image side, and a positive meniscus lens that is convex toward the object side.

As described above, the two negative lenses are disposed in the first-a lens group G1a. Thereby, it is possible to obtain a negative refractive power which is necessary for achieving wide angle, and it is possible to reduce the angle of the principal ray incident at a peripheral angle of view into the first-b lens group G1b. As a result, it is possible to reduce occurrence of astigmatism in the portion in and after the first-b lens group G1b.

Further, in order from a position closest to the object side, a negative meniscus lens that is convex toward the object side, and a negative lens that is concave toward the image side are disposed. Thereby, it is possible to secure a negative refractive power for achieving wide angle while suppressing occurrence of distortion. The positive meniscus lens convex toward the object side is disposed on the image side. Thereby, it is possible to correct longitudinal chromatic aberration, it is possible to suitably correct lateral chromatic aberration at the wide-angle end, and it is possible to correct spherical aberration at the telephoto end.

It is preferable that the first-b lens group G1b consists of a positive lens that is convex toward the image side, and the first-c lens group G1c consists of, in order from the object side, a cemented lens that is formed by cementing a negative lens concave toward the image side and a biconvex lens in order from the object side, and a positive lens that is convex toward the object side.

Since the first-b lens group G1b is configured as described above, it is possible to suppress occurrence of spherical aberration during focusing. Further, since the first-c lens group G1c is configured as described above, there is an advantage in correcting chromatic aberration of the first lens group G1 and spherical aberration on the telephoto side while achieving reduction in size. Furthermore, since the direction of the cemented surface is convex toward the object side, it is possible to suppress occurrence of lateral chromatic aberration with a high angle of view at the wide-angle end.

The fourth lens group G4 may have a negative refractive power, and may have a positive refractive power. In a case where the fourth lens group G4 has a negative refractive power, it is possible to perform the zooming operation while moving the third lens group G3 and the fourth lens group G4 in cooperation with each other. Therefore, it is possible to suppress fluctuations in various aberrations during zooming. In contrast, in a case where the fourth lens group G4 has a positive refractive power, it is possible to minimize the height of the marginal ray to the fifth lens group G5. Therefore, it is possible to suppress occurrence of spherical aberration in the fifth lens group G5.

In the example shown in FIG. 1, the optical member PP is disposed between the lens system and the image plane Sim. However, various filters such as a lowpass filter and a filter for cutting off a specific wavelength region may not be disposed between the lens system and the image plane Sim. Instead, such various filters may be disposed between the lenses, or coating for functions the same as those of various filters may be performed on a lens surface of any lens.

Next, numerical examples of the zoom lens of the present invention will be described.

First, a zoom lens of Example 1 will be described. FIG. 1 is a cross-sectional view illustrating a lens configuration of the zoom lens of Example 1. In FIG. 1 and FIGS. 2 to 12 corresponding to Examples 2 to 12 to be described later, aberrations in the wide-angle end state are shown in the upper part, on-axis rays wa and rays with the maximum angle of view wb are shown as rays. In addition, aberrations in the telephoto end state are shown in the lower part, and on-axis rays ta and rays with the maximum angle of view tb are shown as rays. Each drawing shows a state where the object at infinity is in focus, where the left side of the drawing is the object side and the right side of the drawing is the image side. It should be noted that the aperture stop St shown in the drawing does not necessarily indicate its size and shape, and indicates a position of the stop on the optical axis Z.

The zoom lens of Example 1 is composed of, in order from the object side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power.

The first lens group G1 is composed of seven lenses L11 to L17. The second lens group G2 is composed of only one lens L21. The third lens group G3 is composed of four lenses L31 to L34. The fourth lens group G4 is composed of two lenses L41 and L42. The fifth lens group G5 is composed of nine lenses L51 to L59.

The first lens group G1 is composed of a first-a lens group G1a consisting of three lenses L11 to L13, a first-b lens group G1b consisting of only one lens L14, and a first-c lens group G1c consisting of three lenses L15 to L17.

Table 1 shows basic lens data of the zoom lens of Example 1, Table 2 shows data about specification, and Table 3 shows data about variable surface distances. Hereinafter, meanings of the reference signs in the tables are, for example, as described in Example 1, and are basically the same as those in Examples 2 to 12.

In the lens data of Table 1, the column of the surface number shows surface numbers. The surface of the elements closest to the object side is the first surface, and the surface numbers sequentially increase toward the image plane side. The column of the radius of curvature shows radii of curvature of the respective surfaces. The column of the on-axis surface distance shows distances on the optical axis Z between the respective surfaces and the subsequent surfaces. Further, the column of nd shows a refractive index of each optical element at the d line (a wavelength of 587.6 nm (nanometers)), and the column of vd shows an Abbe number of each optical element at the d line (a wavelength of 587.6 nm).

Here, the sign of the radius of curvature is positive in a case where a surface has a shape convex toward the object side, and is negative in a case where a surface has a shape convex toward the image plane side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during zooming, DD[surface number] is noted. Numerical values each corresponding to the DD[surface number] are shown in Table 3.

In the data about the specification of Table 2, values of the zoom ratio, the focal length f', the F number FNo., and the total angle of view 2ω are noted.

In the basic lens data, the data about specification, and the data about variable surface distances, a degree is used as a unit of an angle, and mm is used as a unit of a length, but appropriate different units may be used since the optical system can be used even in a case where the system is enlarged or reduced in proportion.

TABLE 1

Example 1 • Lens Data

| Surface Number | Radius of Curvature | Surface Spacing | nd | vd |
|---|---|---|---|---|
| 1 | 76.61541 | 2.300 | 1.91082 | 35.25 |
| 2 | 33.56400 | 14.241 | | |
| 3 | −201.16388 | 2.200 | 1.91082 | 35.25 |
| 4 | 83.56609 | 13.942 | | |
| 5 | 66.02817 | 4.001 | 1.89286 | 20.36 |
| 6 | 111.80779 | 5.602 | | |
| 7 | 6242.39464 | 5.501 | 1.49905 | 81.20 |
| 8 | −111.12186 | 6.951 | | |
| 9 | 223.47999 | 2.201 | 1.71271 | 29.49 |
| 10 | 41.84117 | 13.120 | 1.51009 | 80.28 |
| 11 | −90.92667 | 0.120 | | |
| 12 | 79.47859 | 4.563 | 1.79501 | 48.84 |
| 13 | −1359.26065 | DD[13] | | |
| 14 | 120.22965 | 3.201 | 1.54062 | 75.66 |
| 15 | −224.71075 | DD[15] | | |
| 16 | 62.29998 | 1.200 | 1.90557 | 37.44 |
| 17 | 27.32275 | 6.578 | | |
| 18 | −44.44453 | 1.200 | 1.43875 | 94.66 |
| 19 | 32.09475 | 1.969 | | |
| 20 | 33.98298 | 5.610 | 1.59270 | 35.31 |
| 21 | −47.06984 | 1.051 | 1.59282 | 68.62 |
| 22 | −648.86171 | DD[22] | | |
| 23 | −28.53792 | 1.051 | 1.59282 | 68.62 |
| 24 | 118.86777 | 2.110 | 1.59270 | 35.31 |
| 25 | −171.82898 | DD[25] | | |
| 26 (Stop) | ∞ | 2.002 | | |
| 27 | 132.72242 | 3.001 | 1.84667 | 23.83 |
| 28 | −95.06119 | 0.281 | | |
| 29 | 33.33355 | 7.711 | 1.49700 | 81.54 |
| 30 | −31.54574 | 1.100 | 1.95360 | 32.33 |
| 31 | 992.70252 | 8.959 | | |
| 32 | 113.15719 | 4.201 | 1.76358 | 34.78 |
| 33 | −50.42003 | 1.000 | | |
| 34 | 43.86121 | 1.112 | 1.95214 | 32.49 |
| 35 | 18.65089 | 5.822 | 1.73743 | 54.31 |
| 36 | 121.45114 | 0.343 | | |
| 37 | 37.38582 | 11.684 | 1.43875 | 94.66 |
| 38 | −24.70630 | 1.731 | 2.00100 | 29.13 |
| 39 | 24.53164 | 11.188 | | |
| 40 | 36.16766 | 6.480 | 1.51138 | 64.37 |
| 41 | −62.86268 | 0.000 | | |
| 42 | ∞ | 2.300 | 1.51633 | 64.14 |
| 43 | ∞ | 20.266 | | |

TABLE 2

Example 1 Specification (d Line)

|  | Wide-Angle End | Middle | Telephoto End |
|---|---|---|---|
| Zoom Ratio | 1.0 | 2.0 | 3.0 |
| f | 17.500 | 34.999 | 52.499 |
| FNo. | 2.76 | 2.77 | 2.76 |
| 2ω [°] | 82.2 | 43.6 | 29.8 |

TABLE 3

Example 1 Zoom Distance

|  | Wide-Angle End | Middle | Telephoto End |
|---|---|---|---|
| DD[13] | 1.016 | 10.226 | 17.266 |
| DD[15] | 1.011 | 14.804 | 18.944 |
| DD[22] | 18.669 | 5.051 | 4.367 |
| DD[25] | 21.186 | 11.801 | 1.304 |

FIG. 13 shows aberration diagrams of the zoom lens of Example 1. In addition, spherical aberration, astigmatism, distortion, and lateral chromatic aberration at the wide-angle end are shown in order from the upper left side of FIG. 13, spherical aberration, astigmatism, distortion, and lateral chromatic aberration at the middle position are shown in order from the middle left side of FIG. 13, and spherical aberration, astigmatism, distortion, and lateral chromatic aberration at the telephoto end are shown in order from the lower left side of FIG. 13. Such aberration diagrams show aberrations in a state where the object distance is set as an infinite distance. The diagram of aberrations illustrating spherical aberration, astigmatism, and distortion indicates aberrations that occur in a case where the d line (a wavelength of 587.6 nm) is set as a reference wavelength. In the spherical aberration diagram, aberrations at the d line (a wavelength of 587.6 nm), the C line (a wavelength of 656.3 nm), the F line (a wavelength of 486.1 nm), and the g line (a wavelength of 435.8 nm) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C line (a wavelength of 656.3 nm), the F line (a wavelength of 486.1 nm), and the g line (a wavelength of 435.8 nm) are respectively indicated by the long dashed line, the short dashed line, and the gray solid line. In the spherical aberration diagram, FNo. means an F number. In the other aberration diagrams, ω means a half angle of view.

Figure 14:
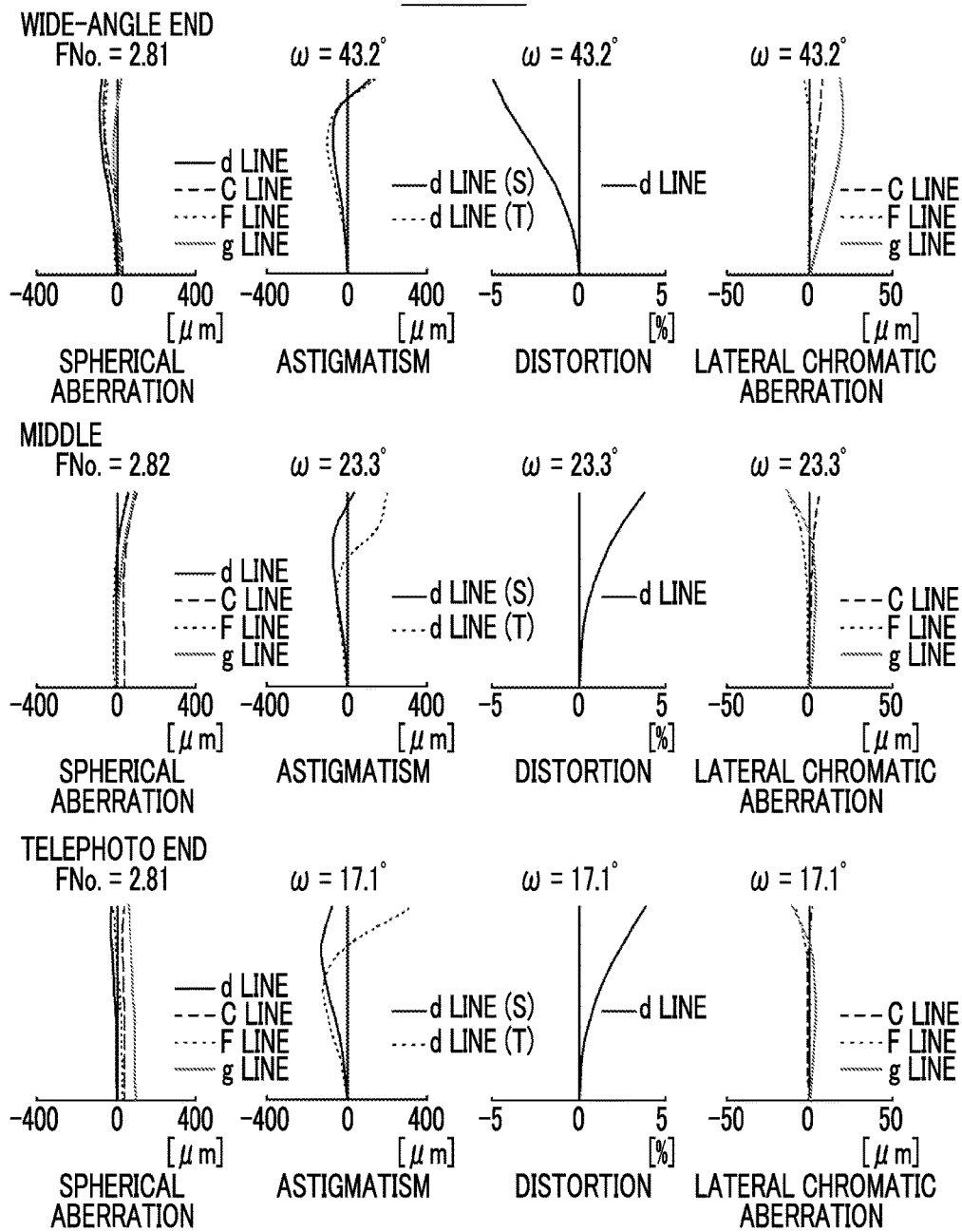
FIG. 14 is a diagram of aberrations of the zoom lens of Example 2 of the present invention.

Next, a zoom lens of Example 2 will be described. FIG. 2 is a cross-sectional view illustrating a lens configuration of the zoom lens of Example 2. Compared with the zoom lens of Example 1, the zoom lens of Example 2 is the same in terms of a configuration of the refractive power of each group and a configuration of the number of lenses of each group. Further, Table 4 shows basic lens data of the zoom lens of Example 2, Table 5 shows data about specification, and Table 6 shows data about variable surface distances. FIG. 14 shows aberration diagrams thereof.

TABLE 4

Example 2 • Lens Data

| Surface Number | Radius of Curvature | Surface Distance | nd | vd |
|---|---|---|---|---|
| 1 | 75.95708 | 2.319 | 1.91082 | 35.25 |
| 2 | 33.55713 | 12.800 |  |  |
| 3 | −486.89275 | 2.201 | 1.90088 | 36.35 |
| 4 | 59.29143 | 17.337 |  |  |
| 5 | 60.19182 | 4.001 | 1.89286 | 20.36 |
| 6 | 84.04152 | 7.174 |  |  |
| 7 | 2669.18110 | 5.501 | 1.50116 | 80.85 |
| 8 | −117.64746 | 4.456 |  |  |
| 9 | 260.41398 | 2.199 | 1.66972 | 32.28 |
| 10 | 41.88532 | 13.120 | 1.48271 | 85.80 |
| 11 | −83.33327 | 0.120 |  |  |
| 12 | 88.76264 | 4.338 | 1.70656 | 56.96 |
| 13 | −422.69332 | DD[13] |  |  |
| 14 | 89.71789 | 3.628 | 1.57297 | 71.30 |
| 15 | −167.16375 | DD[15] |  |  |
| 16 | 57.26885 | 1.200 | 1.90968 | 36.99 |
| 17 | 27.32247 | 6.291 |  |  |
| 18 | −44.44460 | 1.201 | 1.43875 | 94.66 |
| 19 | 32.89684 | 3.418 |  |  |
| 20 | 36.39245 | 5.610 | 1.59270 | 35.31 |
| 21 | −35.99958 | 1.057 | 1.59282 | 68.62 |
| 22 | 480.49877 | DD[22] |  |  |
| 23 | −27.76711 | 1.054 | 1.59282 | 68.62 |
| 24 | −178.93785 | 2.114 | 1.59270 | 35.31 |
| 25 | −122.06869 | DD[25] |  |  |
| 26 (Stop) | ∞ | 1.405 |  |  |
| 27 | 133.74757 | 3.001 | 1.84667 | 23.83 |
| 28 | −89.86159 | 0.428 |  |  |
| 29 | 34.05520 | 7.712 | 1.49700 | 81.54 |
| 30 | −31.57540 | 1.101 | 1.95283 | 32.41 |
| 31 | 863.74902 | 9.513 |  |  |
| 32 | 107.44231 | 4.201 | 1.74964 | 35.28 |
| 33 | −50.99343 | 1.095 |  |  |
| 34 | 43.40691 | 1.363 | 1.95199 | 32.51 |
| 35 | 18.24527 | 5.520 | 1.72065 | 56.21 |
| 36 | 119.45431 | 2.301 |  |  |
| 37 | 36.10682 | 10.929 | 1.43875 | 94.66 |
| 38 | −23.70138 | 1.006 | 2.00100 | 29.13 |
| 39 | 24.93874 | 8.891 |  |  |
| 40 | 35.37002 | 5.603 | 1.48212 | 64.51 |
| 41 | −50.49723 | 0.000 |  |  |
| 42 | ∞ | 2.300 | 1.51633 | 64.14 |
| 43 | ∞ | 20.265 |  |  |

TABLE 5

Example 2 Specification (d Line)

|  | Wide-Angle End | Middle | Telephoto End |
|---|---|---|---|
| Zoom Ratio | 1.0 | 2.0 | 2.8 |
| f | 16.255 | 32.511 | 45.515 |
| FNo. | 2.81 | 2.82 | 2.81 |
| 2ω [°] | 86.4 | 46.6 | 34.2 |

TABLE 6

Example 2 Zoom Distance

|  | Wide-Angle End | Middle | Telephoto End |
|---|---|---|---|
| DD[13] | 1.007 | 13.346 | 19.236 |
| DD[15] | 1.009 | 12.982 | 16.711 |
| DD[22] | 19.711 | 5.313 | 4.791 |
| DD[25] | 20.310 | 10.397 | 1.299 |

Figure 15:
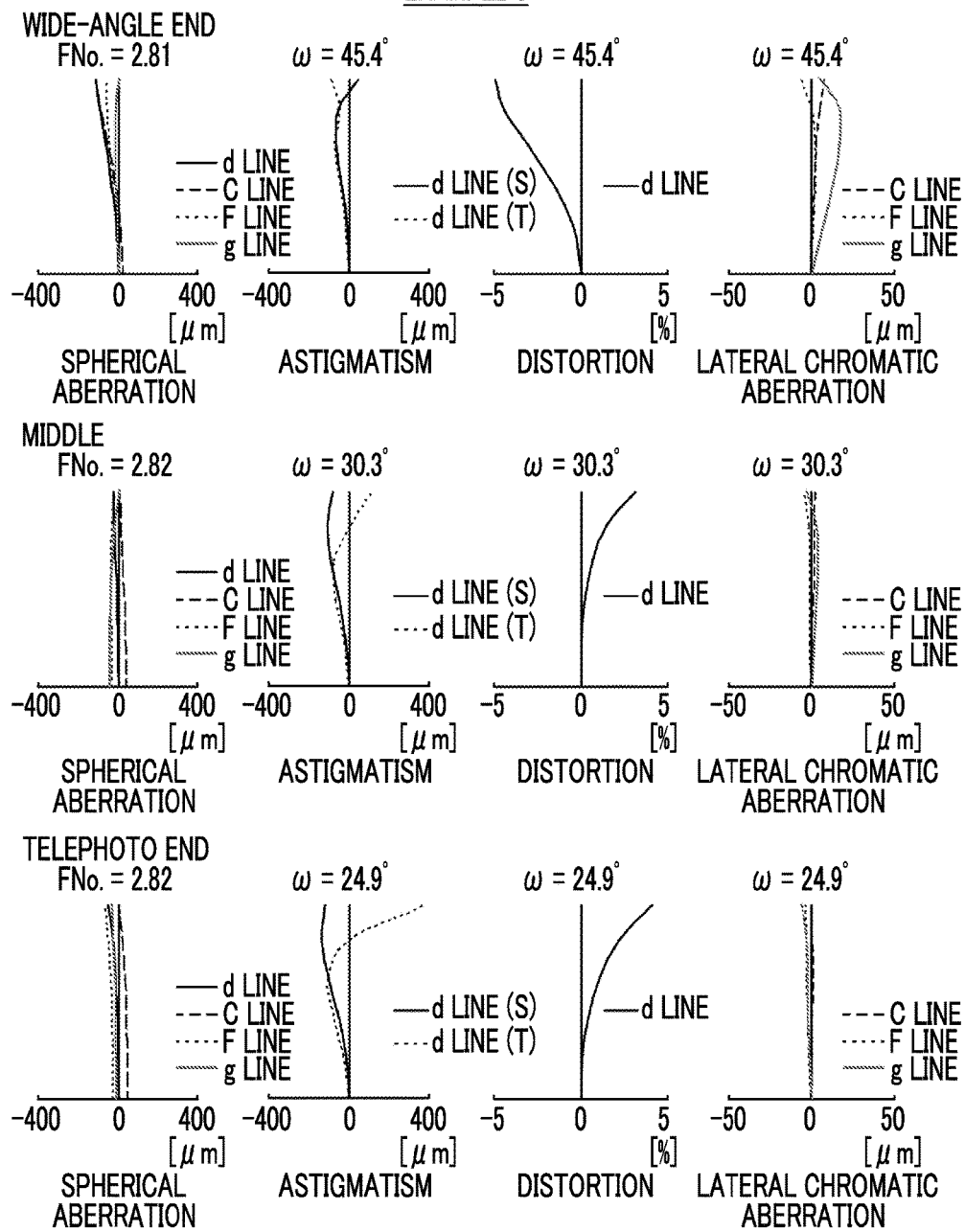
FIG. 15 is a diagram of aberrations of the zoom lens of Example 3 of the present invention.

Next, a zoom lens of Example 3 will be described. FIG. 3 is a cross-sectional view illustrating a lens configuration of the zoom lens of Example 3. Compared with the zoom lens of Example 1, the zoom lens of Example 3 is the same in terms of a configuration of the refractive power of each group and a configuration of the number of lenses of each group except that the fourth lens group G4 is composed of only one lens L41. Further, Table 7 shows basic lens data of the zoom lens of Example 3, Table 8 shows data about specification, and Table 9 shows data about variable surface distances. FIG. 15 shows aberration diagrams thereof.

TABLE 7

Example 3 • Lens Data

| Surface Number | Radius of Curvature | Surface Distance | nd | vd |
|---|---|---|---|---|
| 1 | 66.62031 | 2.300 | 1.94952 | 33.05 |
| 2 | 33.55709 | 12.801 | | |
| 3 | 17774.08323 | 2.551 | 1.94996 | 33.00 |
| 4 | 48.77444 | 16.386 | | |
| 5 | 47.25809 | 4.001 | 1.90032 | 20.25 |
| 6 | 54.64595 | 6.887 | | |
| 7 | 6086.25376 | 6.915 | 1.49813 | 81.35 |
| 8 | −121.03277 | 4.716 | | |
| 9 | −1992.16137 | 2.770 | 1.72739 | 30.22 |
| 10 | 41.84100 | 13.120 | 1.49641 | 83.04 |
| 11 | −157.26286 | 0.120 | | |
| 12 | 91.22552 | 6.437 | 1.84922 | 43.87 |
| 13 | −117.22381 | DD[13] | | |
| 14 | 73.41170 | 3.845 | 1.59282 | 68.62 |
| 15 | −221.58782 | DD[15] | | |
| 16 | 60.15039 | 1.400 | 1.88443 | 39.56 |
| 17 | 27.32240 | 6.277 | | |
| 18 | −44.86932 | 1.328 | 1.43875 | 94.66 |
| 19 | 29.79551 | 3.209 | | |
| 20 | 33.82389 | 5.610 | 1.59270 | 35.31 |
| 21 | −44.07330 | 1.182 | 1.59282 | 68.62 |
| 22 | 560.27952 | DD[22] | | |
| 23 | −26.17302 | 1.150 | 1.74304 | 46.08 |
| 24 | −50.26395 | DD[24] | | |
| 25 (Stop) | ∞ | 3.895 | | |
| 26 | 168.20262 | 4.686 | 1.89398 | 22.43 |
| 27 | −89.33131 | 2.517 | | |
| 28 | 33.85867 | 8.903 | 1.49700 | 81.54 |
| 29 | −31.74252 | 1.108 | 1.92307 | 35.24 |
| 30 | 350.07661 | 7.851 | | |
| 31 | 143.67744 | 5.990 | 1.75093 | 43.62 |
| 32 | −47.84735 | 1.000 | | |
| 33 | 45.68984 | 1.101 | 1.95375 | 32.32 |
| 34 | 18.23027 | 5.549 | 1.75394 | 52.44 |
| 35 | 179.72572 | 0.312 | | |
| 36 | 37.98016 | 12.149 | 1.43875 | 94.66 |
| 37 | −24.96656 | 1.012 | 2.00100 | 29.13 |
| 38 | 26.69269 | 0.836 | | |
| 39 | 39.93458 | 6.649 | 1.47325 | 62.40 |
| 40 | −57.67390 | 0.000 | | |
| 41 | ∞ | 2.300 | 1.51633 | 64.14 |
| 42 | ∞ | 20.236 | | |

TABLE 8

Example 3 Specification (d Line)

| | Wide-Angle End | Middle | Telephoto End |
|---|---|---|---|
| Zoom Ratio | 1.0 | 1.6 | 2.0 |
| f | 15.037 | 24.058 | 30.073 |
| FNo. | 2.81 | 2.82 | 2.82 |
| 2ω [°] | 90.8 | 60.6 | 49.8 |

TABLE 9

Example 3 Zoom Distance

| | Wide-Angle End | Middle | Telephoto End |
|---|---|---|---|
| DD[13] | 1.501 | 16.446 | 24.105 |
| DD[15] | 1.030 | 7.286 | 9.416 |
| DD[22] | 22.576 | 8.207 | 3.763 |
| DD[24] | 13.481 | 6.649 | 1.304 |

Figure 16:
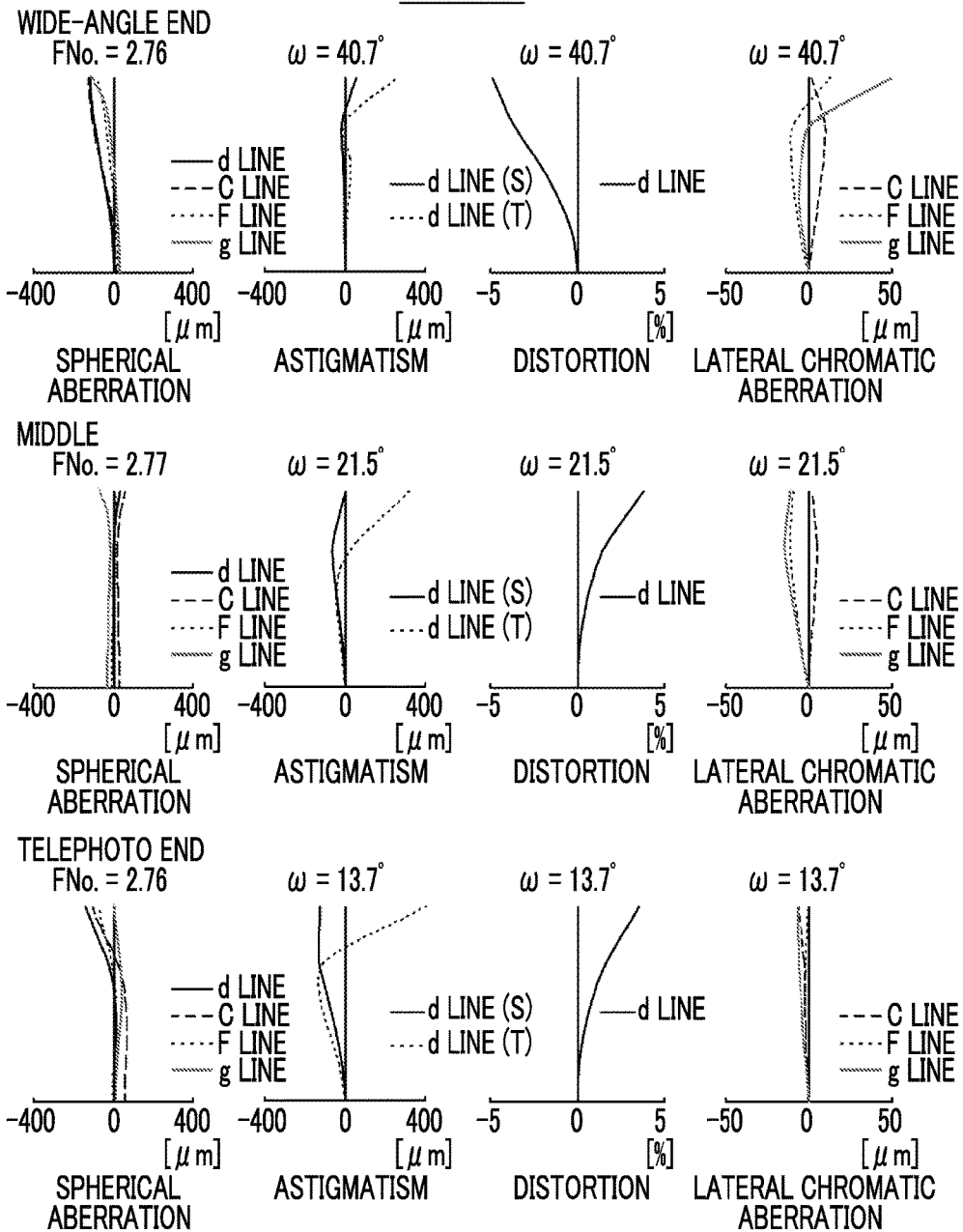
FIG. 16 is a diagram of aberrations of the zoom lens of Example 4 of the present invention.

Next, a zoom lens of Example 4 will be described. FIG. 4 is a cross-sectional view illustrating a lens configuration of the zoom lens of Example 4. Compared with the zoom lens of Example 3, the zoom lens of Example 4 is the same in terms of a configuration of the refractive power of each group and a configuration of the number of lenses of each group. Further, Table 10 shows basic lens data of the zoom lens of Example 4, Table 11 shows data about specification, and Table 12 shows data about variable surface distances. FIG. 16 shows aberration diagrams thereof.

TABLE 10

Example 4 • Lens Data

| Surface Number | Radius of Curvature | Surface Distance | nd | vd |
|---|---|---|---|---|
| 1 | 75.12413 | 2.798 | 1.91082 | 35.25 |
| 2 | 35.07661 | 17.287 | | |
| 3 | −183.39794 | 2.402 | 1.91082 | 35.25 |
| 4 | 107.49859 | 11.780 | | |
| 5 | 73.82309 | 4.012 | 1.82902 | 22.49 |
| 6 | 129.79007 | 8.413 | | |
| 7 | −379.10409 | 5.476 | 1.43875 | 94.66 |
| 8 | −105.28033 | 7.252 | | |
| 9 | 147.66757 | 1.801 | 1.69877 | 30.58 |
| 10 | 47.29560 | 15.022 | 1.53591 | 75.01 |
| 11 | −88.60385 | 0.573 | | |
| 12 | 86.40309 | 4.984 | 1.81851 | 47.06 |
| 13 | 796.84325 | DD[13] | | |
| 14 | 352.78425 | 2.699 | 1.43875 | 94.66 |
| 15 | −182.42589 | DD[15] | | |
| 16 | 61.59625 | 1.217 | 2.00069 | 25.46 |
| 17 | 28.56184 | 7.891 | | |
| 18 | −42.20781 | 1.217 | 1.59277 | 68.63 |
| 19 | ∞ | 1.000 | | |
| 20 | ∞ | 1.228 | 1.43917 | 94.56 |
| 21 | 46.41290 | 4.050 | 1.82438 | 22.64 |
| 22 | −246.34991 | DD[22] | | |
| 23 | −27.28239 | 1.217 | 1.43875 | 94.66 |
| 24 | −98.00172 | DD[24] | | |
| 25 (Stop) | ∞ | 1.554 | | |
| 26 | 192.59390 | 2.976 | 1.84666 | 23.78 |
| 27 | −118.91217 | 0.199 | | |
| 28 | 27.67749 | 9.718 | 1.43875 | 94.66 |
| 29 | −40.21965 | 1.217 | 1.95375 | 32.32 |
| 30 | 162.10282 | 7.205 | | |
| 31 | 231.94064 | 4.701 | 1.80519 | 25.47 |
| 32 | −50.21696 | 4.267 | | |
| 33 | 34.33636 | 1.217 | 1.95375 | 32.32 |
| 34 | 17.98758 | 7.555 | 1.69680 | 55.53 |
| 35 | 143.89514 | 0.576 | | |
| 36 | 125.04862 | 7.554 | 1.43875 | 94.66 |
| 37 | −21.83018 | 1.217 | 1.85478 | 24.80 |
| 38 | 47.27873 | 18.145 | | |
| 39 | 108.25480 | 3.400 | 1.80610 | 40.93 |
| 40 | −172.52255 | 0.000 | | |
| 41 | ∞ | 2.212 | 1.51633 | 64.14 |
| 42 | ∞ | 23.518 | | |

TABLE 11

Example 4 Specification (d Line)

|  | Wide-Angle End | Middle | Telephoto End |
|---|---|---|---|
| Zoom Ratio | 1.0 | 2.0 | 3.2 |
| f | 19.574 | 39.149 | 63.616 |
| FNo. | 2.76 | 2.77 | 2.76 |
| 2ω [°] | 81.4 | 43.0 | 27.4 |

TABLE 12

Example 4 Zoom Distance

|  | Wide-Angle End | Middle | Telephoto End |
|---|---|---|---|
| DD[13] | 1.400 | 14.375 | 28.976 |
| DD[15] | 1.000 | 15.527 | 16.963 |
| DD[22] | 21.634 | 5.481 | 6.244 |
| DD[24] | 29.128 | 17.780 | 0.979 |

Figure 17:
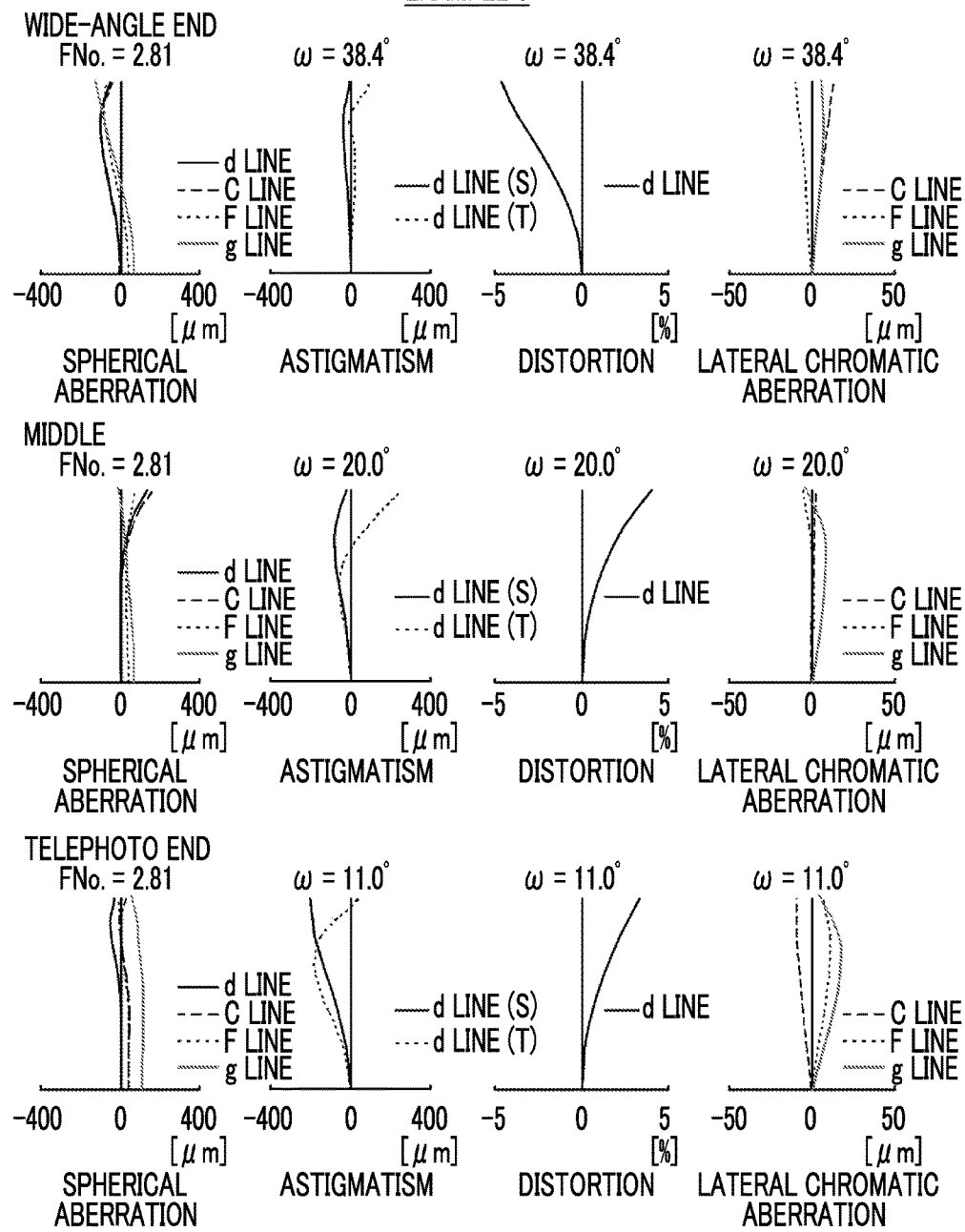
FIG. 17 is a diagram of aberrations of the zoom lens of Example 5 of the present invention.

Next, a zoom lens of Example 5 will be described. FIG. 5 is a cross-sectional view illustrating a lens configuration of the zoom lens of Example 5. Compared with the zoom lens of Example 1, the zoom lens of Example 5 is the same in terms of a configuration of the refractive power of each group and a configuration of the number of lenses of each group except that the third lens group G3 is composed of three lenses L31 to L33. Further, Table 13 shows basic lens data of the zoom lens of Example 5, Table 14 shows data about specification, and Table 15 shows data about variable surface distances. FIG. 17 shows aberration diagrams thereof.

TABLE 13

Example 5 • Lens Data

| Surface Number | Radius of Curvature | Surface Distance | nd | vd |
|---|---|---|---|---|
| 1 | 100.49843 | 2.300 | 1.91082 | 35.25 |
| 2 | 36.60593 | 11.940 |  |  |
| 3 | −170.49497 | 2.223 | 1.88300 | 40.76 |
| 4 | 123.97991 | 11.107 |  |  |
| 5 | 78.56359 | 4.610 | 1.75893 | 24.77 |
| 6 | 178.29774 | 7.339 |  |  |
| 7 | 485.11502 | 6.980 | 1.49700 | 81.54 |
| 8 | −96.38070 | 3.932 |  |  |
| 9 | 99.29681 | 2.202 | 1.74053 | 29.75 |
| 10 | 41.15376 | 14.425 | 1.53775 | 74.70 |
| 11 | −95.75688 | 0.120 |  |  |
| 12 | 91.65753 | 3.847 | 1.83648 | 44.96 |
| 13 | 498.10287 | DD[13] |  |  |
| 14 | 222.37466 | 2.000 | 1.43875 | 94.66 |
| 15 | −583.00409 | DD[15] |  |  |
| 16 | 70.44263 | 1.226 | 1.91179 | 31.76 |
| 17 | 27.53490 | 5.982 |  |  |
| 18 | −40.31233 | 1.326 | 1.49700 | 81.54 |
| 19 | 35.38548 | 2.120 |  |  |
| 20 | 39.75755 | 3.723 | 1.68206 | 29.56 |
| 21 | −146.86589 | DD[21] |  |  |
| 22 | −34.20530 | 1.161 | 1.69560 | 59.05 |
| 23 | 85.48479 | 2.052 | 1.80519 | 25.48 |
| 24 | −494.16216 | DD[24] |  |  |
| 25 (Stop) | ∞ | 1.400 |  |  |
| 26 | 196.89361 | 2.718 | 1.90200 | 25.26 |
| 27 | −77.71574 | 0.429 |  |  |
| 28 | 32.58302 | 7.663 | 1.43875 | 94.66 |
| 29 | −36.33941 | 1.160 | 1.90366 | 31.31 |
| 30 | 285.77887 | 12.848 |  |  |

TABLE 13-continued

Example 5 • Lens Data

| Surface Number | Radius of Curvature | Surface Distance | nd | vd |
|---|---|---|---|---|
| 31 | −1547.82841 | 3.366 | 1.80519 | 25.48 |
| 32 | −47.18327 | 3.514 |  |  |
| 33 | 39.27414 | 1.823 | 1.85478 | 24.80 |
| 34 | 19.07778 | 5.669 | 1.69560 | 59.05 |
| 35 | 86.42178 | 0.302 |  |  |
| 36 | 38.85705 | 12.749 | 1.49700 | 81.54 |
| 37 | −29.08941 | 1.480 | 2.00100 | 29.13 |
| 38 | 29.63583 | 18.402 |  |  |
| 39 | 40.01005 | 6.782 | 1.53172 | 48.84 |
| 40 | −80.05392 | 0.000 |  |  |
| 41 | ∞ | 2.300 | 1.51633 | 64.14 |
| 42 | ∞ | 21.014 |  |  |

TABLE 14

Example 5 Specification (d Line)

|  | Wide-Angle End | Middle | Telephoto End |
|---|---|---|---|
| Zoom Ratio | 1.0 | 2.0 | 3.8 |
| f | 19.162 | 38.324 | 72.240 |
| FNo. | 2.81 | 2.81 | 2.81 |
| 2ω [°] | 76.8 | 40.0 | 22.0 |

TABLE 15

Example 5 Zoom Distance

|  | Wide-Angle End | Middle | Telephoto End |
|---|---|---|---|
| DD[13] | 0.485 | 11.118 | 24.662 |
| DD[15] | 0.475 | 14.551 | 17.670 |
| DD[21] | 24.793 | 5.779 | 3.108 |
| DD[24] | 20.463 | 14.768 | 0.776 |

Figure 18:
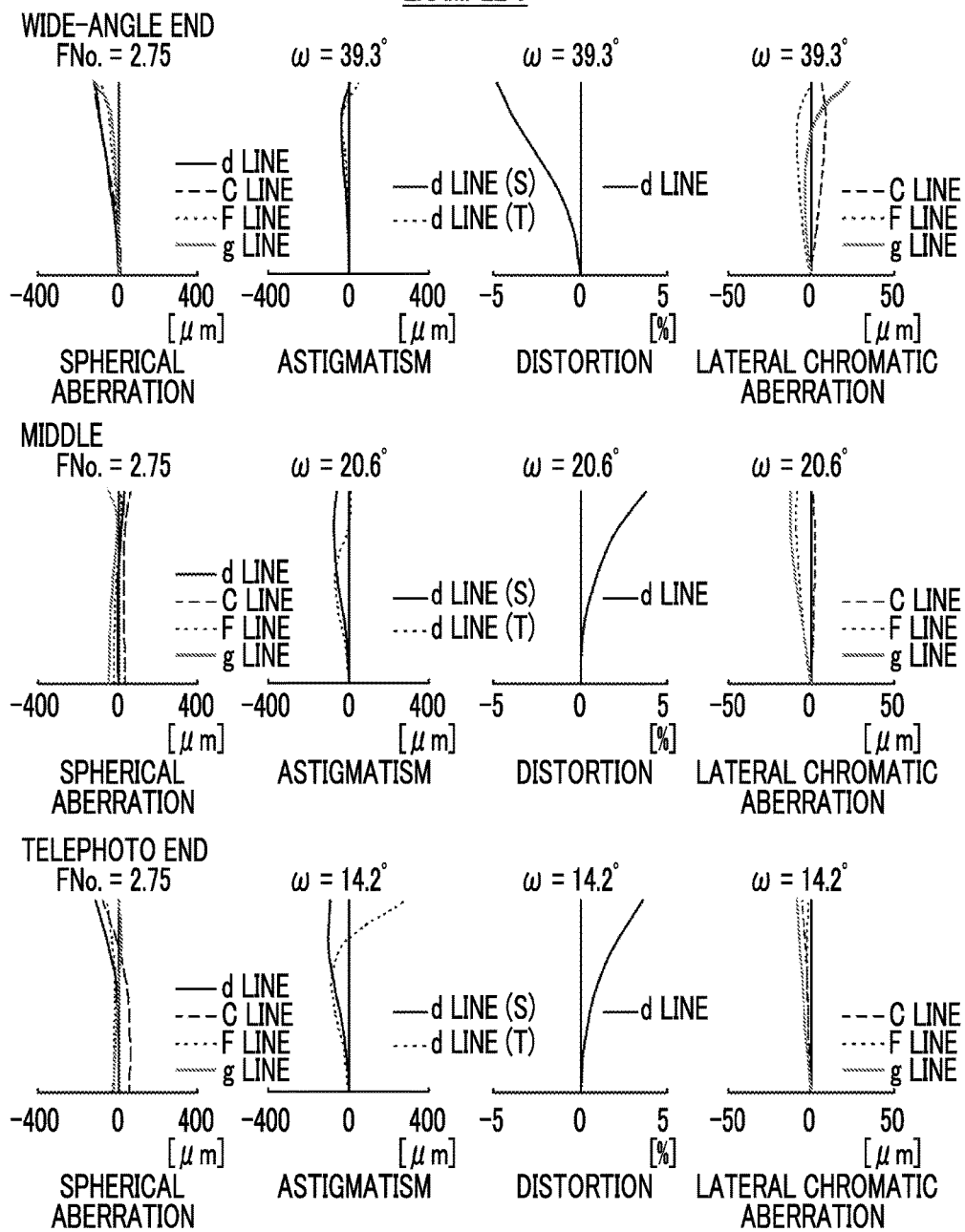
FIG. 18 is a diagram of aberrations of the zoom lens of Example 6 of the present invention.

Next, a zoom lens of Example 6 will be described. FIG. 6 is a cross-sectional view illustrating a lens configuration of the zoom lens of Example 6. Compared with the zoom lens of Example 3, the zoom lens of Example 6 is the same in terms of a configuration of the refractive power of each group and a configuration of the number of lenses of each group. Further, Table 16 shows basic lens data of the zoom lens of Example 6, Table 17 shows data about specification, and Table 18 shows data about variable surface distances. FIG. 18 shows aberration diagrams thereof.

TABLE 16

Example 6 • Lens Data

| Surface Number | Radius of Curvature | Surface Distance | nd | vd |
|---|---|---|---|---|
| 1 | 71.81199 | 1.985 | 1.91082 | 35.25 |
| 2 | 32.04995 | 14.013 |  |  |
| 3 | −169.85281 | 1.700 | 1.91082 | 35.25 |
| 4 | 98.50747 | 10.073 |  |  |
| 5 | 64.50130 | 3.696 | 1.80809 | 22.76 |
| 6 | 117.95395 | 7.691 |  |  |
| 7 | −403.81604 | 5.000 | 1.43875 | 94.66 |
| 8 | −97.82956 | 6.601 |  |  |
| 9 | 134.88124 | 1.699 | 1.68893 | 31.07 |
| 10 | 41.15500 | 13.633 | 1.53775 | 74.70 |
| 11 | −81.84788 | 0.119 |  |  |

TABLE 16-continued

Example 6 • Lens Data

| Surface Number | Radius of Curvature | Surface Distance | nd | vd |
|---|---|---|---|---|
| 12 | 74.80796 | 4.299 | 1.81600 | 46.62 |
| 13 | 581.93071 | DD[13] | | |
| 14 | 414.70166 | 2.982 | 1.43875 | 94.66 |
| 15 | −192.35317 | DD[15] | | |
| 16 | 60.59836 | 1.100 | 2.00069 | 25.46 |
| 17 | 26.58276 | 6.718 | | |
| 18 | −41.83532 | 1.100 | 1.59282 | 68.62 |
| 19 | ∞ | 1.300 | | |
| 20 | ∞ | 1.110 | 1.43875 | 94.66 |
| 21 | 41.41600 | 3.799 | 1.80809 | 22.76 |
| 22 | −208.57686 | DD[22] | | |
| 23 | −25.69507 | 1.100 | 1.43875 | 94.66 |
| 24 | −97.61823 | DD[24] | | |
| 25 (Stop) | ∞ | 1.551 | | |
| 26 | 161.82650 | 2.794 | 1.84666 | 23.78 |
| 27 | −112.24837 | 0.200 | | |
| 28 | 24.93850 | 8.887 | 1.43875 | 94.66 |
| 29 | −36.50700 | 1.100 | 1.95375 | 32.32 |
| 30 | 144.41888 | 7.038 | | |
| 31 | 202.67016 | 4.161 | 1.80519 | 25.47 |
| 32 | −45.05170 | 3.087 | | |
| 33 | 30.96070 | 1.100 | 1.95375 | 32.32 |
| 34 | 16.39300 | 7.709 | 1.69680 | 55.53 |
| 35 | 124.08371 | 0.249 | | |
| 36 | 119.27490 | 6.410 | 1.43875 | 94.66 |
| 37 | −19.73100 | 1.100 | 1.85478 | 24.80 |
| 38 | 41.19779 | 13.499 | | |
| 39 | 96.33050 | 3.006 | 1.80610 | 40.93 |
| 40 | −171.61879 | 24.783 | | |

TABLE 17

Example 6 Specification (d Line)

| | Wide-Angle End | Middle | Telephoto End |
|---|---|---|---|
| Zoom Ratio | 1.0 | 2.0 | 3.0 |
| f' | 18.592 | 37.183 | 55.217 |
| FNo. | 2.75 | 2.75 | 2.75 |
| 2ω [°] | 78.6 | 41.2 | 28.4 |

TABLE 18

Example 6 Zoom Distance

| | Wide-Angle End | Middle | Telephoto End |
|---|---|---|---|
| DD[13] | 1.726 | 10.015 | 20.857 |
| DD[15] | 1.184 | 17.312 | 18.458 |
| DD[22] | 17.241 | 4.375 | 5.041 |
| DD[24] | 25.173 | 13.622 | 0.967 |

Next, a zoom lens of Example 7 will be described. FIG. 7 is a cross-sectional view illustrating a lens configuration of the zoom lens of Example 7.

The zoom lens of Example 7 is composed of, in order from the object side, a first lens group G1 having a positive refractive power, a second lens group G2 having a positive refractive power, a third lens group G3 having a negative refractive power, a fourth lens group G4 having a positive refractive power, and a fifth lens group G5 having a positive refractive power.

The first lens group G1 is composed of seven lenses L11 to L17. The second lens group G2 is composed of only one lens L21. The third lens group G3 is composed of four lenses L31 to L34. The fourth lens group G4 is composed of three lenses L41 to L43. The fifth lens group G5 is composed of five lenses L51 to L55.

The first lens group G1 is composed of a first-a lens group G1a consisting of three lenses L11 to L13, a first-b lens group G1b consisting of only one lens L14, and a first-c lens group G1c consisting of three lenses L15 to L17.

Figure 19:
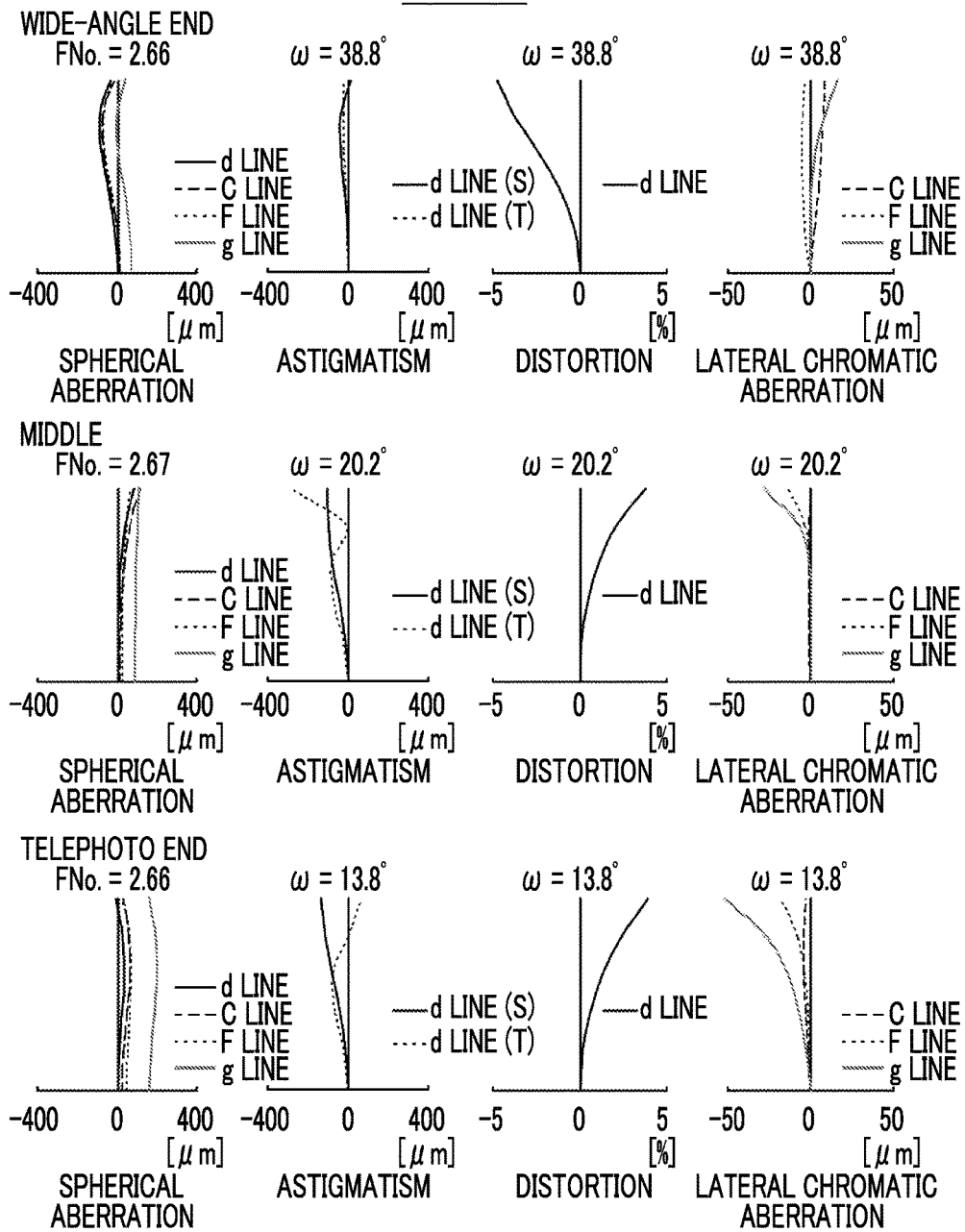
FIG. 19 is a diagram of aberrations of the zoom lens of Example 7 of the present invention.

Further, Table 19 shows basic lens data of the zoom lens of Example 7, Table 20 shows data about specification, and Table 21 shows data about variable surface distances. FIG. 19 shows aberration diagrams thereof.

TABLE 19

Example 7 • Lens Data

| Surface Number | Radius of Curvature | Surface Distance | nd | vd |
|---|---|---|---|---|
| 1 | 70.24179 | 2.300 | 2.00100 | 29.13 |
| 2 | 36.36367 | 12.396 | | |
| 3 | −159.96478 | 2.199 | 1.90043 | 37.37 |
| 4 | 107.72364 | 10.430 | | |
| 5 | 68.75317 | 4.094 | 1.72084 | 27.06 |
| 6 | 110.51072 | 9.897 | | |
| 7 | −510.10131 | 3.814 | 1.59135 | 68.82 |
| 8 | −116.83894 | 7.167 | | |
| 9 | 116.55003 | 2.200 | 1.77690 | 26.16 |
| 10 | 49.94545 | 13.319 | 1.52189 | 77.37 |
| 11 | −77.88064 | 0.120 | | |
| 12 | 62.90982 | 3.661 | 1.87893 | 41.16 |
| 13 | 136.05012 | DD[13] | | |
| 14 | 55.52215 | 4.442 | 1.59282 | 68.62 |
| 15 | 305.49002 | DD[15] | | |
| 16 | 73.27567 | 1.199 | 1.90000 | 35.22 |
| 17 | 22.56967 | 5.871 | | |
| 18 | −41.89884 | 1.200 | 1.59282 | 68.62 |
| 19 | 48.62680 | 0.120 | | |
| 20 | 34.85092 | 4.364 | 1.90000 | 22.99 |
| 21 | −72.06425 | 5.347 | | |
| 22 | −31.23903 | 2.000 | 1.89982 | 36.86 |
| 23 | 167.99167 | DD[23] | | |
| 24 | 102.81542 | 1.051 | 1.90000 | 35.43 |
| 25 | 30.34761 | 6.224 | 1.48789 | 86.36 |
| 26 | −63.72015 | 0.151 | | |
| 27 | 45.14367 | 3.160 | 1.89999 | 38.00 |
| 28 | 260.36165 | DD[28] | | |
| 29 (Stop) | ∞ | 8.811 | | |
| 30 | 65.53926 | 2.832 | 1.90000 | 38.00 |
| 31 | −523.43116 | 7.492 | | |
| 32 | 81.27867 | 1.900 | 1.78519 | 31.90 |
| 33 | 23.99563 | 6.685 | 1.49700 | 81.54 |
| 34 | −56.11055 | 2.597 | | |
| 35 | 48.30450 | 10.010 | 1.49700 | 81.54 |
| 36 | −22.30546 | 3.000 | 1.98943 | 29.91 |
| 37 | 125.66404 | 0.000 | | |
| 38 | ∞ | 2.300 | 1.51633 | 64.14 |
| 39 | ∞ | 24.682 | | |

TABLE 20

Example 7 Specification (d Line)

| | Wide-Angle End | Middle | Telephoto End |
|---|---|---|---|
| Zoom Ratio | 1.0 | 2.0 | 3.0 |
| f' | 18.954 | 37.908 | 56.861 |
| FNo. | 2.66 | 2.67 | 2.66 |
| 2ω [°] | 77.6 | 40.4 | 27.6 |

TABLE 21

Example 7 Zoom Distance

|  | Wide-Angle End | Middle | Telephoto End |
|---|---|---|---|
| DD[13] | 1.071 | 9.558 | 19.049 |
| DD[15] | 0.499 | 14.032 | 16.372 |
| DD[23] | 19.810 | 10.027 | 0.973 |
| DD[28] | 16.671 | 4.434 | 1.657 |

Figure 20:
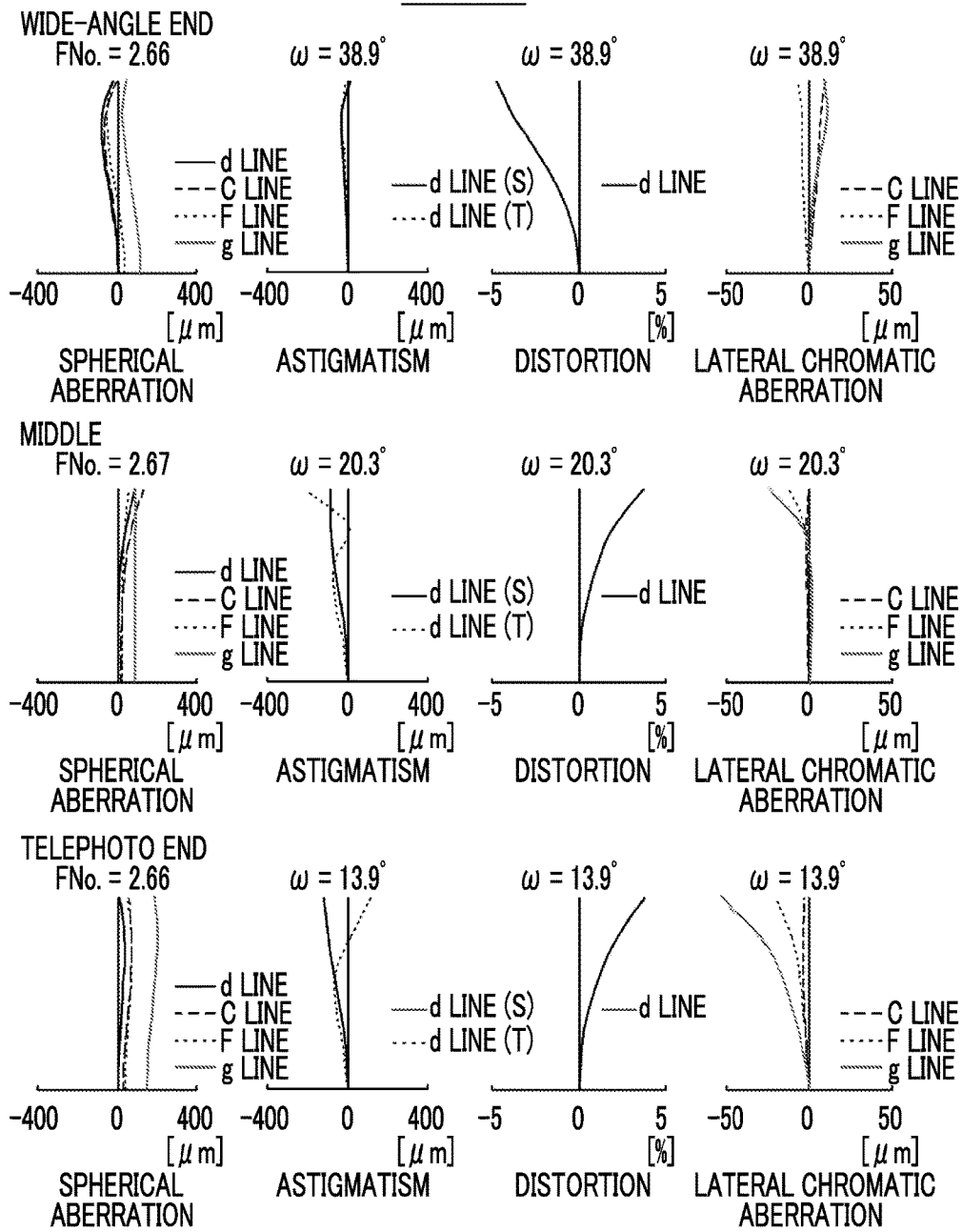
FIG. 20 is a diagram of aberrations of the zoom lens of Example 8 of the present invention.

Next, a zoom lens of Example 8 will be described. FIG. 8 is a cross-sectional view illustrating a lens configuration of the zoom lens of Example 8. Compared with the zoom lens of Example 7, the zoom lens of Example 8 is the same in terms of a configuration of the refractive power of each group and a configuration of the number of lenses of each group. Further, Table 22 shows basic lens data of the zoom lens of Example 8, Table 23 shows data about specification, and Table 24 shows data about variable surface distances. FIG. 20 shows aberration diagrams thereof.

TABLE 22

Example 8 • Lens Data

| Surface Number | Radius of Curvature | Surface Distance | nd | vd |
|---|---|---|---|---|
| 1 | 68.23470 | 2.300 | 2.00100 | 29.13 |
| 2 | 35.78947 | 12.731 |  |  |
| 3 | −159.03830 | 2.199 | 1.90043 | 37.37 |
| 4 | 106.64171 | 9.965 |  |  |
| 5 | 68.89785 | 4.026 | 1.72018 | 27.10 |
| 6 | 108.88536 | 10.803 |  |  |
| 7 | −521.31279 | 3.703 | 1.58864 | 69.19 |
| 8 | −120.73054 | 7.236 |  |  |
| 9 | 116.44845 | 2.200 | 1.80127 | 27.16 |
| 10 | 52.39928 | 13.319 | 1.52233 | 77.29 |
| 11 | −73.28829 | 0.120 |  |  |
| 12 | 63.70101 | 3.537 | 1.88243 | 40.82 |
| 13 | 132.10539 | DD[13] |  |  |
| 14 | 54.00777 | 4.196 | 1.57131 | 71.52 |
| 15 | 287.09824 | DD[15] |  |  |
| 16 | 73.83460 | 1.199 | 1.90000 | 33.01 |
| 17 | 22.63769 | 5.890 |  |  |
| 18 | −43.20111 | 1.200 | 1.59282 | 68.62 |
| 19 | 51.32314 | 0.120 |  |  |
| 20 | 37.26063 | 4.317 | 1.90000 | 23.07 |
| 21 | −63.84021 | 3.384 |  |  |
| 22 | −33.92273 | 2.000 | 1.89879 | 37.68 |
| 23 | 264.90729 | DD[23] |  |  |
| 24 | 103.60879 | 1.050 | 1.90000 | 35.82 |
| 25 | 30.20395 | 6.093 | 1.47565 | 88.42 |
| 26 | −85.42533 | 0.150 |  |  |
| 27 | 44.88548 | 3.177 | 1.90000 | 38.00 |
| 28 | 212.80129 | DD[28] |  |  |
| 29 (Stop) | ∞ | 9.291 |  |  |
| 30 | 64.18568 | 3.074 | 1.89999 | 38.00 |
| 31 | −338.70465 | 9.583 |  |  |
| 32 | 82.91454 | 1.215 | 1.74935 | 29.32 |
| 33 | 23.17418 | 6.762 | 1.49700 | 81.54 |
| 34 | −61.71318 | 1.566 |  |  |
| 35 | 50.42563 | 10.010 | 1.49700 | 81.54 |
| 36 | −22.03001 | 3.000 | 1.98635 | 30.12 |
| 37 | 103.79307 | 0.000 |  |  |
| 38 | ∞ | 2.300 | 1.51633 | 64.14 |
| 39 | ∞ | 24.283 |  |  |

TABLE 23

Example 8 Specification (d Line)

|  | Wide-Angle End | Middle | Telephoto End |
|---|---|---|---|
| Zoom Ratio | 1.0 | 2.0 | 3.0 |
| f' | 18.852 | 37.704 | 56.556 |
| FNo. | 2.66 | 2.67 | 2.66 |
| 2ω [°] | 77.8 | 40.6 | 27.8 |

TABLE 24

Example 8 Zoom Distance

|  | Wide-Angle End | Middle | Telephoto End |
|---|---|---|---|
| DD[13] | 1.153 | 14.908 | 28.049 |
| DD[15] | 0.623 | 12.255 | 13.310 |
| DD[23] | 25.164 | 12.477 | 1.153 |
| DD[28] | 17.483 | 4.783 | 1.911 |

Figure 21:
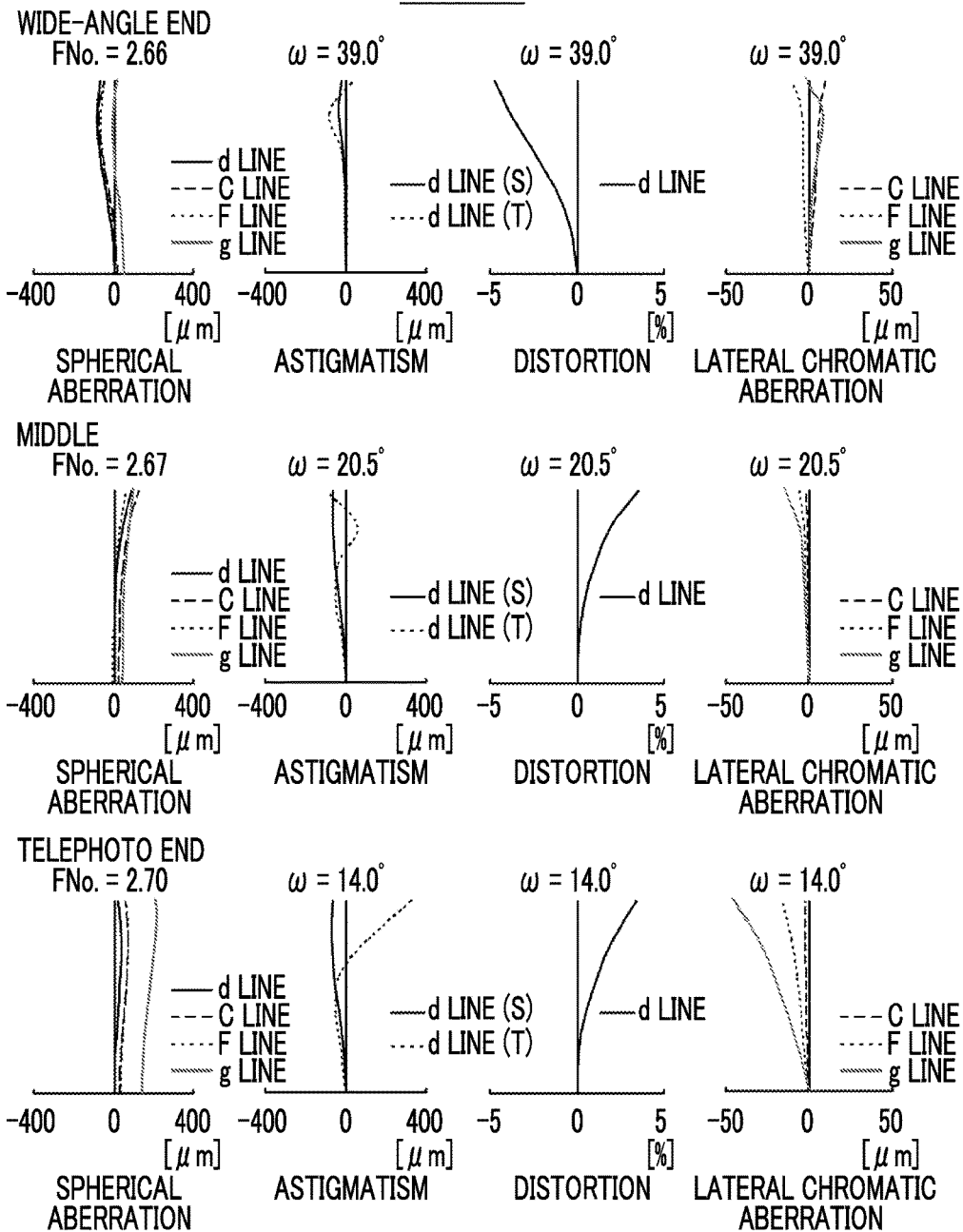
FIG. 21 is a diagram of aberrations of the zoom lens of Example 9 of the present invention.

Next, a zoom lens of Example 9 will be described. FIG. 9 is a cross-sectional view illustrating a lens configuration of the zoom lens of Example 9. Compared with the zoom lens of Example 7, the zoom lens of Example 9 is the same in terms of a configuration of the refractive power of each group and a configuration of the number of lenses of each group. Further, Table 25 shows basic lens data of the zoom lens of Example 9, Table 26 shows data about specification, and Table 27 shows data about variable surface distances. FIG. 21 shows aberration diagrams thereof.

TABLE 25

Example 9 • Lens Data

| Surface Number | Radius of Curvature | Surface Distance | nd | vd |
|---|---|---|---|---|
| 1 | 62.69514 | 2.299 | 2.00100 | 29.13 |
| 2 | 33.73916 | 13.590 |  |  |
| 3 | −141.10134 | 2.200 | 1.89992 | 37.47 |
| 4 | 110.49207 | 4.490 |  |  |
| 5 | 62.57255 | 3.835 | 1.75211 | 25.05 |
| 6 | 91.17471 | 14.892 |  |  |
| 7 | −322.87061 | 3.659 | 1.59282 | 68.62 |
| 8 | −107.64311 | 7.588 |  |  |
| 9 | 122.22826 | 2.199 | 1.77699 | 28.92 |
| 10 | 57.09231 | 13.320 | 1.51194 | 79.04 |
| 11 | −66.87108 | 0.120 |  |  |
| 12 | 61.62506 | 3.588 | 1.88300 | 40.76 |
| 13 | 121.20140 | DD[13] |  |  |
| 14 | 52.54675 | 3.912 | 1.59051 | 68.94 |
| 15 | 384.98538 | DD[15] |  |  |
| 16 | 90.86711 | 1.199 | 1.90000 | 31.91 |
| 17 | 22.15340 | 6.471 |  |  |
| 18 | −42.84531 | 1.199 | 1.59282 | 68.62 |
| 19 | 60.83884 | 0.120 |  |  |
| 20 | 41.21202 | 4.012 | 1.90000 | 26.50 |
| 21 | −64.98293 | 0.617 |  |  |
| 22 | −34.90200 | 2.000 | 1.72776 | 51.66 |
| 23 | −830.66341 | DD[23] |  |  |
| 24 | 88.95522 | 1.051 | 1.90000 | 38.00 |
| 25 | 28.17694 | 6.050 | 1.43875 | 94.66 |
| 26 | −183.82577 | 0.150 |  |  |
| 27 | 43.19999 | 3.088 | 1.90000 | 32.61 |
| 28 | 158.51445 | DD[28] |  |  |
| 29 (Stop) | ∞ | 2.000 |  |  |
| 30 | 53.80944 | 2.757 | 1.90000 | 38.00 |
| 31 | 397.21405 | 10.352 |  |  |
| 32 | 78.35478 | 1.100 | 1.79467 | 28.91 |
| 33 | 23.10345 | 7.029 | 1.49700 | 81.54 |

TABLE 25-continued

Example 9 • Lens Data

| Surface Number | Radius of Curvature | Surface Distance | nd | vd |
|---|---|---|---|---|
| 34 | −50.73233 | 7.219 | | |
| 35 | 47.19526 | 10.010 | 1.49700 | 81.54 |
| 36 | −20.79019 | 3.000 | 1.99799 | 29.34 |
| 37 | 104.36447 | 0.000 | | |
| 38 | ∞ | 2.300 | 1.51633 | 64.14 |
| 39 | ∞ | 22.012 | | |

TABLE 26

Example 9 Specification (d Line)

| | Wide-Angle End | Middle | Telephoto End |
|---|---|---|---|
| Zoom Ratio | 1.0 | 2.0 | 3.0 |
| f | 18.773 | 37.547 | 56.320 |
| FNo. | 2.66 | 2.67 | 2.70 |
| 2ω [°] | 78.0 | 41.0 | 28.0 |

TABLE 27

Example 9 Zoom Distance

| | Wide-Angle End | Middle | Telephoto End |
|---|---|---|---|
| DD[13] | 1.188 | 25.744 | 45.928 |
| DD[15] | 0.771 | 7.331 | 5.655 |
| DD[23] | 36.574 | 17.097 | 1.345 |
| DD[28] | 16.192 | 4.553 | 1.797 |

Figure 22:
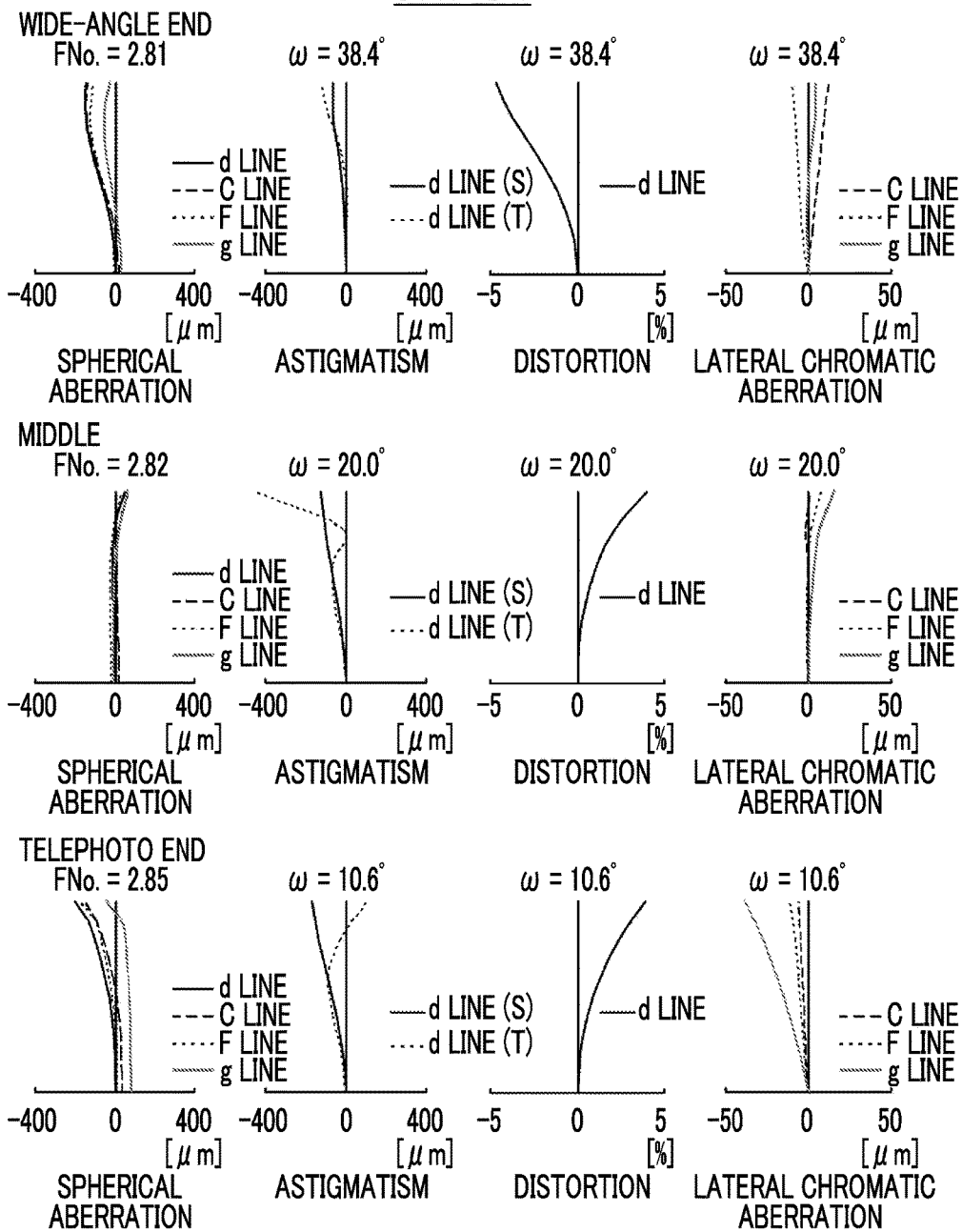
FIG. 22 is a diagram of aberrations of the zoom lens of Example 10 of the present invention.

Next, a zoom lens of Example 10 will be described. FIG. 10 is a cross-sectional view illustrating a lens configuration of the zoom lens of Example 10. Compared with the zoom lens of Example 7, the zoom lens of Example 10 is the same in terms of a configuration of the refractive power of each group and a configuration of the number of lenses of each group. Further, Table 28 shows basic lens data of the zoom lens of Example 10, Table 29 shows data about specification, and Table 30 shows data about variable surface distances. FIG. 22 shows aberration diagrams thereof.

TABLE 28

Example 10 • Lens Data

| Surface Number | Radius of Curvature | Surface Distance | nd | vd |
|---|---|---|---|---|
| 1 | 75.43452 | 2.300 | 2.00100 | 29.13 |
| 2 | 36.61520 | 11.626 | | |
| 3 | −158.53008 | 2.199 | 1.89919 | 37.61 |
| 4 | 148.94755 | 10.875 | | |
| 5 | 70.61573 | 3.941 | 1.73914 | 25.88 |
| 6 | 139.97863 | 7.859 | | |
| 7 | −555.35725 | 4.379 | 1.58171 | 70.12 |
| 8 | −134.48299 | 8.899 | | |
| 9 | 104.16586 | 2.199 | 1.82385 | 29.00 |
| 10 | 48.18130 | 13.319 | 1.51971 | 77.73 |
| 11 | −78.29202 | 0.120 | | |
| 12 | 69.10274 | 3.290 | 1.87983 | 41.07 |
| 13 | 126.18802 | DD[13] | | |
| 14 | 50.22693 | 4.744 | 1.59263 | 68.65 |
| 15 | 224.32942 | DD[15] | | |
| 16 | 69.37232 | 1.201 | 1.89999 | 32.83 |
| 17 | 21.32743 | 6.021 | | |
| 18 | −40.54826 | 1.200 | 1.59283 | 68.62 |
| 19 | 52.95905 | 0.119 | | |
| 20 | 36.32561 | 4.894 | 1.87368 | 22.97 |
| 21 | −55.63430 | 2.132 | | |
| 22 | −34.18995 | 2.001 | 1.90000 | 37.29 |
| 23 | 201.15049 | DD[23] | | |
| 24 | 99.24431 | 1.051 | 1.90001 | 37.82 |
| 25 | 30.06991 | 5.171 | 1.44157 | 94.18 |
| 26 | −100.59908 | 0.151 | | |
| 27 | 44.55772 | 2.242 | 1.90000 | 36.27 |
| 28 | 216.58347 | DD[28] | | |
| 29 (Stop) | ∞ | 5.223 | | |
| 30 | 57.13395 | 3.336 | 1.83221 | 44.11 |
| 31 | 353.92249 | 9.740 | | |
| 32 | 95.97311 | 1.729 | 1.70462 | 34.50 |
| 33 | 23.86217 | 7.810 | 1.49700 | 81.54 |
| 34 | −53.94742 | 9.961 | | |
| 35 | 51.91054 | 8.793 | 1.49700 | 81.54 |
| 36 | −21.62364 | 3.001 | 1.96232 | 31.74 |
| 37 | 258.48265 | 0.000 | | |
| 38 | ∞ | 2.300 | 1.51633 | 64.14 |
| 39 | ∞ | 25.968 | | |

TABLE 29

Example 10 Specification (d Line)

| | Wide-Angle End | Middle | Telephoto End |
|---|---|---|---|
| Zoom Ratio | 1.0 | 2.0 | 3.9 |
| f | 19.174 | 38.347 | 74.777 |
| FNo. | 2.81 | 2.82 | 2.85 |
| 2ω [°] | 76.8 | 40.0 | 21.2 |

TABLE 30

Example 10 Zoom Distance

| | Wide-Angle End | Middle | Telephoto End |
|---|---|---|---|
| DD[13] | 0.669 | 10.205 | 28.005 |
| DD[15] | 0.284 | 14.652 | 18.464 |
| DD[23] | 29.414 | 18.268 | −0.422 |
| DD[28] | 16.893 | 4.135 | 1.213 |

Figure 23:
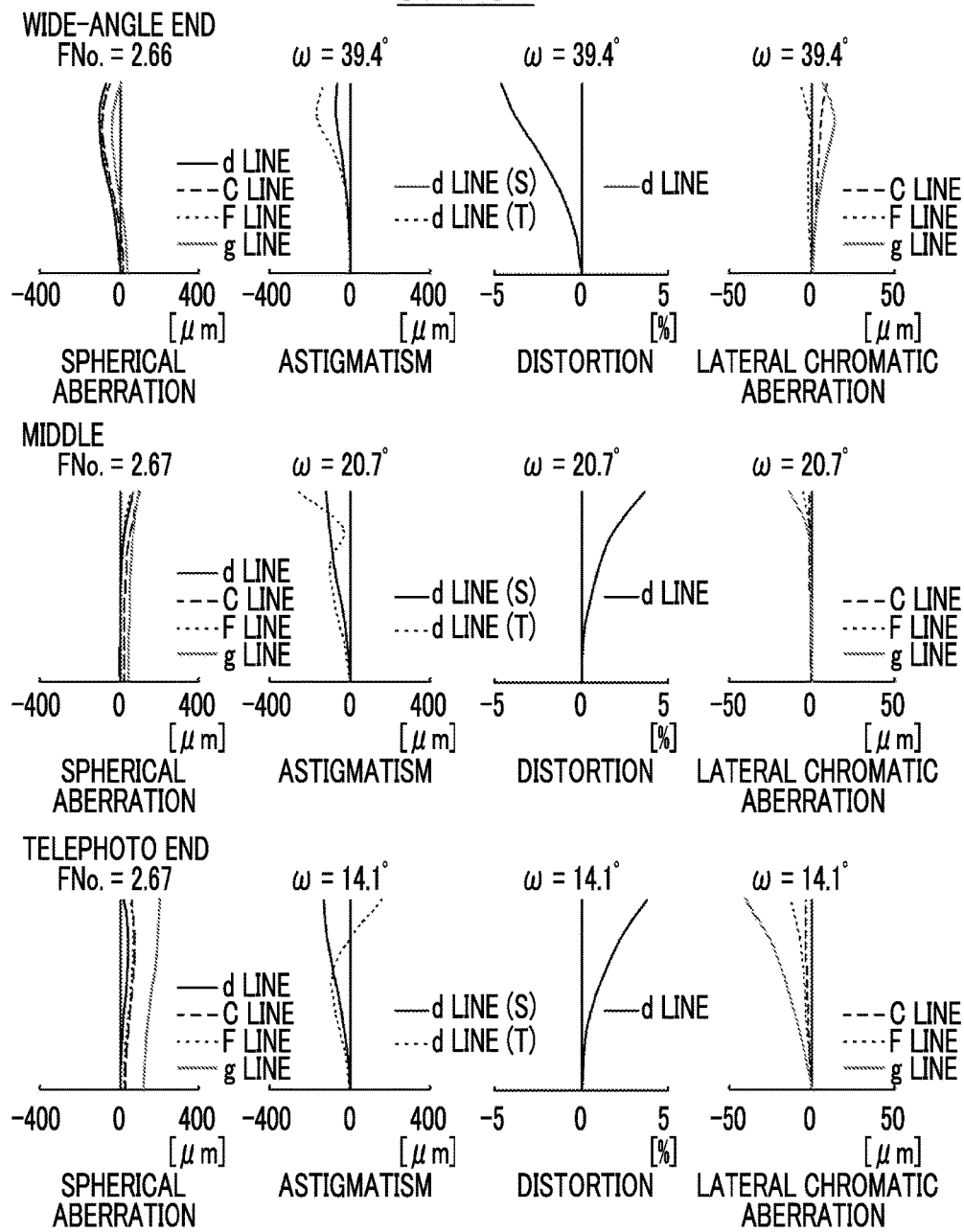
FIG. 23 is a diagram of aberrations of the zoom lens of Example 11 of the present invention.

Next, a zoom lens of Example 11 will be described. FIG. 11 is a cross-sectional view illustrating a lens configuration of the zoom lens of Example 11. Compared with the zoom lens of Example 7, the zoom lens of Example 11 is the same in terms of a configuration of the refractive power of each group and a configuration of the number of lenses of each group. Further, Table 31 shows basic lens data of the zoom lens of Example 11, Table 32 shows data about specification, and Table 33 shows data about variable surface distances. FIG. 23 shows aberration diagrams thereof.

TABLE 31

Example 11 • Lens Data

| Surface Number | Radius of Curvature | Surface Distance | nd | vd |
|---|---|---|---|---|
| 1 | 64.01482 | 2.300 | 2.00100 | 29.13 |
| 2 | 34.25815 | 13.114 | | |
| 3 | −152.86228 | 2.199 | 1.90043 | 37.37 |
| 4 | 102.27104 | 4.189 | | |
| 5 | 61.27633 | 3.754 | 1.75089 | 25.13 |
| 6 | 86.86483 | 15.742 | | |
| 7 | −392.22913 | 3.708 | 1.59282 | 68.62 |
| 8 | −111.87408 | 6.820 | | |
| 9 | 118.61091 | 2.200 | 1.76223 | 27.92 |
| 10 | 56.30436 | 13.319 | 1.51111 | 79.17 |
| 11 | −68.33072 | 0.121 | | |
| 12 | 61.84838 | 3.476 | 1.88300 | 40.76 |
| 13 | 118.22863 | DD[13] | | |
| 14 | 52.84953 | 4.029 | 1.59282 | 68.62 |
| 15 | 293.38233 | DD[15] | | |
| 16 | 81.06942 | 1.201 | 1.90000 | 31.88 |
| 17 | 22.16046 | 6.204 | | |
| 18 | −41.63340 | 1.200 | 1.59282 | 68.62 |
| 19 | 58.23181 | 0.121 | | |
| 20 | 40.04869 | 4.256 | 1.90000 | 25.03 |
| 21 | −57.89196 | 1.701 | | |
| 22 | −34.29561 | 2.000 | 1.79228 | 42.51 |
| 23 | 447.37689 | DD[23] | | |
| 24 | 80.85851 | 1.051 | 1.90000 | 38.00 |
| 25 | 28.27674 | 6.063 | 1.43875 | 94.66 |
| 26 | −139.22704 | 0.151 | | |
| 27 | 42.31198 | 3.176 | 1.90000 | 34.85 |
| 28 | 159.87600 | DD[28] | | |
| 29 (Stop) | ∞ | 2.000 | | |
| 30 | 58.12158 | 2.560 | 1.89999 | 38.00 |
| 31 | 431.24761 | 10.496 | | |
| 32 | 73.64056 | 1.101 | 1.77901 | 28.87 |
| 33 | 23.30934 | 6.919 | 1.49700 | 81.54 |
| 34 | −52.50435 | 6.349 | | |
| 35 | 44.65602 | 10.010 | 1.49700 | 81.54 |
| 36 | −20.75262 | 3.000 | 1.99162 | 29.77 |
| 37 | 106.07495 | 23.521 | | |

TABLE 32

Example 11 Specification (d Line)

| | Wide-Angle End | Middle | Telephoto End |
|---|---|---|---|
| Zoom Ratio | 1.0 | 2.0 | 3.0 |
| f' | 18.485 | 36.969 | 55.454 |
| FNo. | 2.66 | 2.67 | 2.67 |
| 2ω [°] | 78.8 | 41.4 | 28.2 |

TABLE 33

Example 11 Zoom Distance

| | Wide-Angle End | Middle | Telephoto End |
|---|---|---|---|
| DD[13] | 1.125 | 19.836 | 35.771 |
| DD[15] | 0.668 | 10.718 | 11.116 |
| DD[23] | 31.038 | 15.085 | 1.249 |
| DD[28] | 17.177 | 4.368 | 1.872 |

Figure 24:
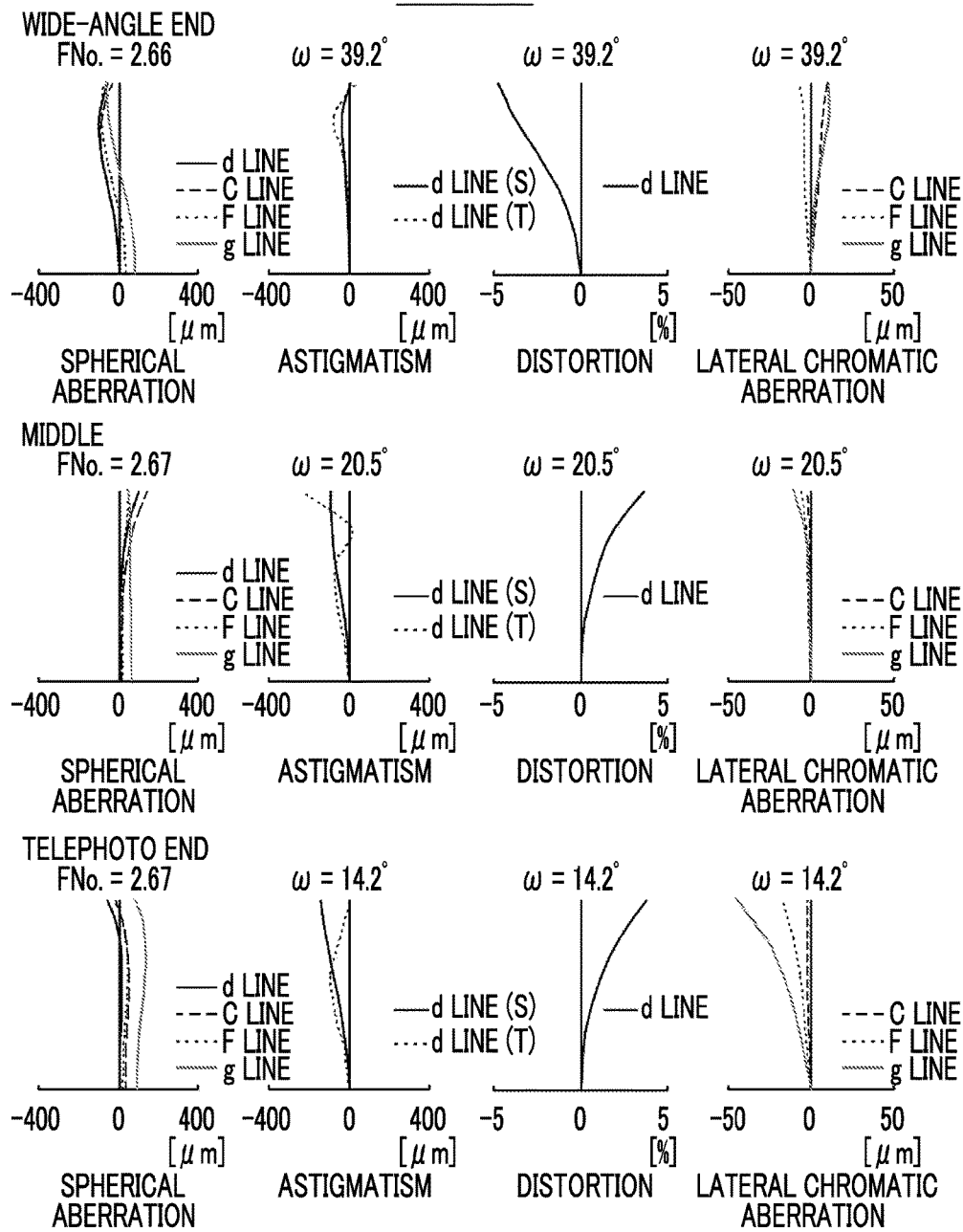
FIG. 24 is a diagram of aberrations of the zoom lens of Example 12 of the present invention.

Next, a zoom lens of Example 12 will be described. FIG. 12 is a cross-sectional view illustrating a lens configuration of the zoom lens of Example 12. Compared with the zoom lens of Example 7, the zoom lens of Example 12 is the same in terms of a configuration of the refractive power of each group and a configuration of the number of lenses of each group except that the fifth lens group G5 is composed of six lenses L51 to L56. Further, Table 34 shows basic lens data of the zoom lens of Example 12, Table 35 shows data about specification, and Table 36 shows data about variable surface distances. FIG. 24 shows aberration diagrams thereof.

TABLE 34

Example 12 Lens Data

| Surface Number | Radius of Curvature | Surface Distance | nd | vd |
|---|---|---|---|---|
| 1 | 71.66549 | 2.299 | 1.91082 | 35.25 |
| 2 | 34.00689 | 14.131 | | |
| 3 | −124.89531 | 2.200 | 1.90480 | 36.44 |
| 4 | 111.74292 | 6.718 | | |
| 5 | 67.81472 | 3.648 | 1.85475 | 21.63 |
| 6 | 106.68591 | 9.474 | | |
| 7 | −145.76618 | 5.398 | 1.59282 | 68.62 |
| 8 | −83.81236 | 7.367 | | |
| 9 | 102.39892 | 2.200 | 1.82445 | 25.85 |
| 10 | 50.91658 | 13.321 | 1.53775 | 74.70 |
| 11 | −71.89671 | 0.120 | | |
| 12 | 67.67433 | 3.402 | 1.88300 | 40.76 |
| 13 | 138.90793 | DD[13] | | |
| 14 | 48.33546 | 4.174 | 1.59282 | 68.62 |
| 15 | 239.11911 | DD[15] | | |
| 16 | 68.13696 | 1.200 | 1.90000 | 28.70 |
| 17 | 21.87709 | 5.820 | | |
| 18 | −51.44792 | 1.199 | 1.59282 | 68.62 |
| 19 | 49.56987 | 0.429 | | |
| 20 | 36.07220 | 4.158 | 1.85209 | 23.99 |
| 21 | −71.76114 | 1.688 | | |
| 22 | −37.24351 | 2.000 | 1.81198 | 47.92 |
| 23 | 247.39993 | DD[23] | | |
| 24 | 77.47632 | 1.051 | 1.90000 | 38.00 |
| 25 | 27.83184 | 5.927 | 1.43875 | 94.66 |
| 26 | −150.37560 | 0.150 | | |
| 27 | 40.71630 | 3.040 | 1.90000 | 31.31 |
| 28 | 132.44096 | DD[28] | | |
| 29 (Stop) | ∞ | 10.000 | | |
| 30 | 63.96933 | 2.952 | 1.90000 | 38.00 |
| 31 | −549.55272 | 7.105 | | |
| 32 | 77.19422 | 1.682 | 1.74089 | 27.96 |
| 33 | 21.83532 | 7.118 | 1.53775 | 74.70 |
| 34 | −58.27739 | 0.120 | | |
| 35 | 42.96027 | 10.009 | 1.47376 | 87.60 |
| 36 | −25.04039 | 1.200 | 1.95375 | 32.32 |
| 37 | 43.36570 | 2.014 | | |
| 38 | 220.98577 | 2.000 | 1.90000 | 22.58 |
| 39 | −311.28328 | 0.000 | | |
| 40 | ∞ | 2.300 | 1.51633 | 64.14 |
| 41 | ∞ | 27.093 | | |

TABLE 35

Example 12 Specification (d Line)

| | Wide-Angle End | Middle | Telephoto End |
|---|---|---|---|
| Zoom Ratio | 1.0 | 2.0 | 3.0 |
| f' | 18.656 | 37.312 | 55.035 |
| FNo. | 2.66 | 2.67 | 2.67 |
| 2ω [°] | 78.4 | 41.0 | 28.4 |

TABLE 36

| Example 12 Zoom Distance | | | |
|---|---|---|---|
| | Wide-Angle End | Middle | Telephoto End |
| DD[13] | 0.948 | 19.424 | 34.972 |
| DD[15] | 0.512 | 10.075 | 10.583 |
| DD[23] | 30.900 | 14.445 | 1.019 |
| DD[28] | 16.480 | 4.896 | 2.267 |

Table 37 shows values corresponding to Conditional Expressions (1) to (12) of the zoom lenses of Examples 1 to 7. It should be noted that, in the above-mentioned examples, the d line is set as the reference wavelength, and the values shown in the following Table 37 are values at the reference wavelength.

TABLE 37

| Expression Number | Conditional Expression | Example 1 | Example 2 | Example 3 | Example 4 | Example 5 | Example 6 |
|---|---|---|---|---|---|---|---|
| (1) | pr1/f1 | 1.18 | 1.39 | 1.62 | 1.11 | 0.88 | 1.07 |
| (2) | f1/(fw · tanθw) | 3.86 | 4.45 | 4.32 | 3.41 | 3.43 | 3.46 |
| (3) | f1/f2 | 0.41 | 0.66 | 0.71 | 0.21 | 0.14 | 0.18 |
| (4) | f1c/f1a | −1.66 | −2.02 | −2.17 | −1.44 | −1.45 | −1.41 |
| (5) | f1b/f1 | 3.72 | 3.31 | 3.61 | 5.75 | 3.12 | 5.57 |
| (6) | f1b/f1c | 3.22 | 3.08 | 3.50 | 5.14 | 2.48 | 5.06 |
| (7) | f1c/f1 | 1.15 | 1.07 | 1.03 | 1.12 | 1.26 | 1.10 |

| Expression Number | Conditional Expression | Example 7 | Example 8 | Example 9 | Example 10 | Example 11 | Example 12 |
|---|---|---|---|---|---|---|---|
| (1) | pr1/f1 | 0.97 | 1.00 | 1.03 | 0.88 | 1.02 | 1.03 |
| (2) | f1/(fw · tanθw) | 4.14 | 4.15 | 4.23 | 5.05 | 4.39 | 4.48 |
| (3) | f1/f2 | 0.56 | 0.55 | 0.63 | 0.71 | 0.62 | 0.67 |
| (4) | f1c/f1a | −1.48 | −1.50 | −1.55 | −1.41 | −1.59 | −1.56 |
| (5) | f1b/f1 | 4.05 | 4.21 | 4.21 | 3.96 | 3.94 | 4.73 |
| (6) | f1b/f1c | 4.03 | 4.22 | 4.45 | 4.26 | 4.27 | 5.30 |
| (7) | f1c/f1 | 1.01 | 1.00 | 0.95 | 0.93 | 0.92 | 0.89 |

As can be seen from the above-mentioned data, each of the zoom lenses of Examples 1 to 12 is configured as a zoom lens which satisfies Conditional Expressions (1) to (7) and has a total angle of view of 75° or more with wide angle. Thereby, reduction in weight and size is achieved, and thus high optical performance is achieved.

Figure 25:
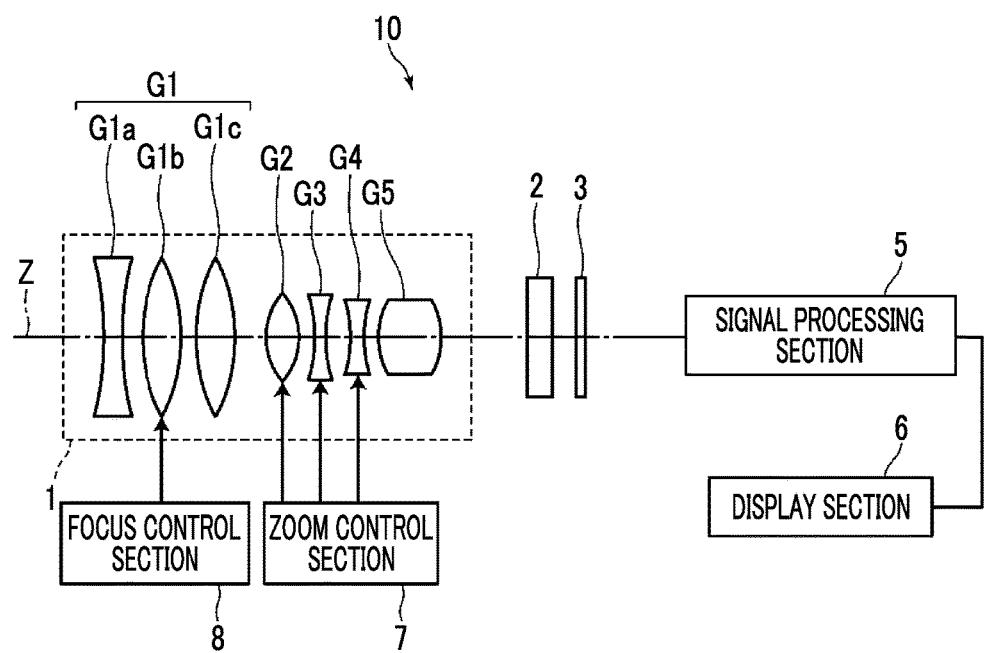
FIG. 25 is a schematic configuration diagram of an imaging apparatus according to an embodiment of the present invention.

Next, an imaging apparatus according to an embodiment of the present invention will be described. FIG. 25 is a schematic configuration diagram of an imaging apparatus 10 using the zoom lens 1 according to the embodiment of the present invention as an example of an imaging apparatus of an embodiment of the present invention. Examples of the imaging apparatus 10 include a movie imaging camera, a broadcast camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 25 schematically shows the first-a lens group G1a, the first-b lens group G1b, the first-c lens group G1c, and the second to fifth lens groups G2 to G5 included in the zoom lens 1.

The imaging element 3 captures an image of a subject, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 25 shows only one imaging element 3, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens are not limited to the values shown in the numerical examples, and different values may be used therefor.

EXPLANATION OF REFERENCES

1: zoom lens
2: filter
3: imaging element
5: signal processing section
6: display section
7: zoom control section
8: focus control section
10: imaging apparatus
G1: first lens group
G1a: first-a lens group
G1b: first-b lens group
G1c: first-c lens group
G2: second lens group
G3: third lens group
G4: fourth lens group
G5: fifth lens group
L11 to L59: lens
PP: optical member
Sim: image plane
St: aperture stop
ta, wa: on-axis rays
tb, wb: rays with maximum angle of view
Z: optical axis

What is claimed is:

1. A zoom lens consisting of, in order from an object side:
a first lens group that has a positive refractive power;
a second lens group that has a positive refractive power;
a third lens group that has a negative refractive power;
a fourth lens group; and
a fifth lens group that has a positive refractive power,
wherein the first lens group and the fifth lens group remain stationary with respect to an image plane during zooming,
wherein the second lens group, the third lens group, and the fourth lens group are moved by changing distances between the lens groups and adjacent groups in a direction of an optical axis during zooming, and are positioned to be closer to the image side at a telephoto end than at a wide-angle end, and
wherein Conditional Expression (1) is satisfied, $$0.8 < pr1/f1 < 2.6 \qquad (1),$$

where pr1 is a distance on the optical axis from a surface toward the image side of a lens, which is closest to the image side in the first lens group, to a position of an image side principal point of the first lens group, and f1 is a focal length of the first lens group.

2. The zoom lens according to claim 1,
wherein Conditional Expression (2) is satisfied, $$2 < f1/(fw \cdot \tan \theta w) < 5.8 \qquad (2),$$

where fw is a focal length of the whole system at the wide-angle end, and
θw is a half angle of view at the wide-angle end.

3. The zoom lens according to claim 2,
wherein Conditional Expression (2-1) is satisfied $$2.5 < f1/(fw \cdot \tan \theta w) < 4.6 \qquad (2\text{-}1).$$

4. The zoom lens according to claim 1,
wherein Conditional Expression (3) is satisfied, $$0 < f1/f2 < 0.8 \qquad (3),$$

where f2 is a focal length of the second lens group.

5. The zoom lens according to claim 1,
wherein the first lens group consists of, in order from the object side, a first-a lens group that has a negative refractive power and remains stationary with respect to the image plane during focusing, a first-b lens group that has a positive refractive power and is moved by changing a distance in the direction of the optical axis between the first-b lens group and an adjacent lens group during focusing, and a first-c lens group that has a positive refractive power.

6. The zoom lens according to claim 5,
wherein Conditional Expression (4) is satisfied, $$-3.4 < f1c/f1a < -0.5 \qquad (4),$$

where f1c is a focal length of the first-c lens group, and f1a is a focal length of the first-a lens group.

7. The zoom lens according to claim 6,
wherein Conditional Expression (4-1) is satisfied $$-2.9 < f1c/f1a < -1.3 \qquad (4\text{-}1).$$

8. The zoom lens according to claim 5,
wherein Conditional Expression (5) is satisfied, $$3.1 < f1b/f1 < 8 \qquad (5),$$

where f1b is a focal length of the first-b lens group.

9. The zoom lens according to claim 8,
wherein Conditional Expression (5-1) is satisfied $$3.7 < f1b/f1 < 6 \qquad (5\text{-}1).$$

10. The zoom lens according to claim 5,
wherein Conditional Expression (6) is satisfied, $$2.4 < f1b/f1c < 8 \qquad (6),$$

where f1b is a focal length of the first-b lens group, and f1c is a focal length of the first-c lens group.

11. The zoom lens according to claim 10,
wherein Conditional Expression (6-1) is satisfied $$3 < f1b/f1c < 6 \qquad (6\text{-}1).$$

12. The zoom lens according to claim 5,
wherein Conditional Expression (7) is satisfied, $$0.5 < f1c/f1 < 1.4 \qquad (7),$$

where f1c is a focal length of the first-c lens group.

13. The zoom lens according to claim 12,
wherein Conditional Expression (7-1) is satisfied $$0.8 < f1c/f1 < 1.3 \qquad (7\text{-}1).$$

14. The zoom lens according to claim 5,
wherein the first-a lens group consists of, in order from the object side, a negative meniscus lens that is convex toward the object side, a negative lens that is concave toward the image side, and a positive meniscus lens that is convex toward the object side.

15. The zoom lens according to claim 5,
wherein the first-b lens group consists of a positive lens that is convex toward the image side, and
wherein the first-c lens group consists of, in order from the object side, a cemented lens that is formed by cementing a negative lens concave toward the image side and a biconvex lens in order from the object side, and a positive lens that is convex toward the object side.

16. The zoom lens according to claim 1,
wherein the fourth lens group has a negative refractive power.

17. The zoom lens according to claim 1,
wherein the fourth lens group has a positive refractive power.

18. The zoom lens according to claim 1,
wherein Conditional Expression (1-1) is satisfied $$0.8 < pr1/f1 < 1.9 \qquad (1\text{-}1).$$

19. An imaging apparatus comprising the zoom lens according to claim 1.

* * * * *